United States Patent
Abraham

(10) Patent No.: US 9,848,752 B2
(45) Date of Patent: Dec. 26, 2017

(54) BASIN FOR USE WITH COMMERCIAL DISH AND GLASSWARE RACKS

(71) Applicant: Alexandra Laray Abraham, Seattle, WA (US)

(72) Inventor: Alexandra Laray Abraham, Seattle, WA (US)

(*) Notice: Subject to any disclaimer, the term of this patent is extended or adjusted under 35 U.S.C. 154(b) by 0 days.

(21) Appl. No.: 14/821,769

(22) Filed: Aug. 9, 2015

(65) Prior Publication Data

US 2015/0374202 A1    Dec. 31, 2015

Related U.S. Application Data

(63) Continuation of application No. 13/748,371, filed on Jan. 23, 2013, now Pat. No. 9,173,543.

(51) Int. Cl.
     *A47B 73/00*      (2006.01)
     *A47F 3/14*      (2006.01)
     (Continued)

(52) U.S. Cl.
     CPC ............ *A47L 15/501* (2013.01); *A47B 73/00* (2013.01); *A47F 10/06* (2013.01);
     (Continued)

(58) Field of Classification Search
     CPC ...... A47L 15/50; A47L 15/501; A47L 15/505; A47L 19/04; A47L 17/02; A47L 19/00; A47G 19/08; A47G 23/02; A47G 23/0208; A47G 23/0216; A47G 23/0241; A47G 23/0266; A47G 23/0641; A47G 23/06; B65D 21/04; B65D 21/048; B65D 81/261; B65D 1/34; B65D 21/0211; B65D 25/30; B65G 57/03; A47B 73/00; A47B 73/006; A47B 73/008; A47B 87/0223; A47B 87/0269; A47F 7/28; A47F 7/281; A47F 7/283; A47F 10/06; A47F 3/145;
     (Continued)

(56) References Cited

U.S. PATENT DOCUMENTS 2,550,355 A * 4/1951 Brown ................ A47G 7/041
                                                          211/181.1
2,575,843 A * 11/1951 Semrow ................ A47K 5/02
                                                          220/572
(Continued)

*Primary Examiner* — Jennifer E Novosad
(74) *Attorney, Agent, or Firm* — Michelle E. Carey; Telekta Law, P.S.

(57) ABSTRACT

A basin which stackably interlocks with 20-inch square racks that hold dish and glassware washed in commercial dishwashers. The basin has substantially the exterior configuration of a commercial dishwasher rack and receives a plurality of dishwasher racks stacked above. The basin solid on its base and sides for prohibiting substances which drip down into it from racks stacked above from dripping onto the floor. The basin has circular indentations in the top surface of the base, trapping water and preventing it from sloshing from side to side of the basin when it is carried or moved. The basin may be loaded into a dolly used to transport commercial dishwasher racks, as the dollies typically have an open bottom. Thus, the basin can provide the water-catching function for racks loaded onto a dolly. Grooves in the basin's bottom surface permit stacking on top of a rack or other basins for storage.

12 Claims, 20 Drawing Sheets

(51) Int. Cl.

| | |
|---|---|
| *A47J 47/00* | (2006.01) |
| *A47L 15/50* | (2006.01) |
| *A47F 10/06* | (2006.01) |
| *A47G 23/06* | (2006.01) |
| *B65G 57/03* | (2006.01) |
| *B65D 1/34* | (2006.01) |
| *B65D 21/02* | (2006.01) |
| *B65D 25/30* | (2006.01) |

(52) U.S. Cl.
CPC .......... *A47G 23/0641* (2013.01); *A47L 15/50* (2013.01); *B65D 1/34* (2013.01); *B65D 21/0211* (2013.01); *B65D 25/30* (2013.01); *B65G 57/03* (2013.01)

(58) Field of Classification Search
CPC .. A47F 3/14; A47F 5/108; A47F 7/144; B42F 7/12; B42F 7/10; A47K 3/004; A47J 47/00; A47J 47/16
USPC .......... 211/41.8, 74, 126.12, 126.2, 194; 206/509, 512, 561, 507, 503, 567; D3/310, 313; 220/4.03, 516, 518, 495, 220/571, 572, 608, 661, 652, 670 M, 675, 220/671; 414/802; 134/92, 84; D7/550.1, 553.2, 554.3
See application file for complete search history.

(56) References Cited

U.S. PATENT DOCUMENTS

| | | | | | |
|---|---|---|---|---|---|
| 2,974,843 | A * | 3/1961 | Reifers | ............... | B65D 81/262 229/407 |
| 3,009,579 | A * | 11/1961 | Ettlinger, Jr. | ......... | A47L 15/501 206/203 |
| 3,039,643 | A * | 6/1962 | Wilson | ................. | B65D 21/046 206/506 |
| 3,245,548 | A * | 4/1966 | Kesilman | ............. | A47L 15/501 206/507 |
| 3,252,582 | A * | 5/1966 | Kesilman | ............. | A47L 15/501 211/41.2 |
| 3,379,339 | A * | 4/1968 | Asenbauer | ........... | B65D 21/046 206/506 |
| 3,482,707 | A * | 12/1969 | Weiss | .................... | A47L 15/501 211/126.2 |
| 3,568,848 | A * | 3/1971 | Tzifkansky | ........... | A47L 15/501 211/41.8 |
| 3,672,530 | A * | 6/1972 | Bridenstine | ........... | B65D 15/20 206/386 |
| 3,865,239 | A * | 2/1975 | Herolzer | ............. | B65D 21/046 206/507 |
| 4,195,746 | A * | 4/1980 | Cottrell | .................... | B65D 1/34 206/545 |
| 4,353,470 | A * | 10/1982 | Polhemus | ................. | B42F 7/12 211/11 |
| 4,527,707 | A * | 7/1985 | Heymann | ............. | A47L 15/501 211/126.1 |
| 4,533,585 | A * | 8/1985 | Holden | .................... | B65D 1/34 220/DIG. 6 |
| 4,621,739 | A * | 11/1986 | Heymann | ............... | A47L 19/04 211/126.14 |
| 4,648,524 | A * | 3/1987 | Ackermann | ........... | A47B 88/20 220/507 |
| 4,735,778 | A * | 4/1988 | Maruyama | ............ | B01L 3/5085 422/553 |
| 4,754,883 | A * | 7/1988 | Grzywa | .................. | A47G 23/06 206/459.5 |
| 4,895,256 | A * | 1/1990 | Johnston | ................ | B25H 3/021 206/203 |
| 4,960,207 | A * | 10/1990 | Tabler | .................. | B65D 21/041 206/386 |
| 4,972,886 | A * | 11/1990 | Bernstein | ................ | F25C 5/002 141/106 |
| 5,147,039 | A * | 9/1992 | Sechler | ................ | B65D 19/004 108/53.1 |
| 5,197,626 | A * | 3/1993 | Bernstein | ........... | A47G 23/0641 141/98 |
| 5,358,137 | A * | 10/1994 | Shuert | ................ | B65D 77/0466 206/600 |
| 5,426,890 | A * | 6/1995 | Dummen | ............... | A01G 9/104 206/507 |
| 5,913,424 | A * | 6/1999 | Kelly | ..................... | B65D 71/70 206/509 |
| 5,934,486 | A * | 8/1999 | Jarvis | ...................... | A47B 81/04 211/126.12 |
| 6,055,996 | A * | 5/2000 | Sprenger | ............. | A47L 15/0076 134/133 |
| 6,634,510 | B2 * | 10/2003 | Larson | .................. | A47L 15/501 211/126.12 |
| 6,726,031 | B2 * | 4/2004 | Laupan | ................. | A47L 15/501 206/509 |
| D515,315 | S * | 2/2006 | Rader | ............................ | D3/304 |
| 7,036,270 | B1 * | 5/2006 | Shepherd | ................. | A01G 9/16 211/74 |
| 7,669,721 | B2 * | 3/2010 | Kemper | .................. | A47L 19/04 211/126.1 |
| 8,479,945 | B1 * | 7/2013 | Simmons | ............. | B65D 81/262 220/571 |
| 8,596,490 | B2 * | 12/2013 | Davidson | ............. | B65D 81/261 206/562 |
| RE44,754 | E * | 2/2014 | Verna | ................... | B65D 21/045 206/505 |
| 8,720,687 | B2 * | 5/2014 | Hassell | ................ | B65D 21/041 206/505 |
| 8,833,594 | B2 * | 9/2014 | Stahl | ........................ | A47F 3/14 206/557 |
| 9,173,543 | B2 * | 11/2015 | Abraham | ............... | A47L 15/501 |
| 2005/0230281 | A1 * | 10/2005 | Hassell | .................. | B65D 1/243 206/509 |
| 2006/0237341 | A1 * | 10/2006 | McDade | ............... | B65D 21/0235 206/509 |
| 2007/0068839 | A1 * | 3/2007 | McDade | .................. | B65D 1/22 206/509 |
| 2009/0050587 | A1 * | 2/2009 | Sandor | .................. | A47L 15/501 211/74 |
| 2011/0114528 | A1 * | 5/2011 | Hirz | ......................... | B65D 1/22 206/509 |
| 2013/0020268 | A1 * | 1/2013 | Domenech Grau | .. | A47L 15/501 211/41.8 |
| 2014/0010629 | A1 * | 1/2014 | Abraham | ............... | A47L 15/501 414/802 |

* cited by examiner

DEPICTION OF PRIOR ART

DEPICTION OF PRIOR ART

DEPICTION OF PRIOR ART

DEPICTION OF PRIOR ART

DEPICTION OF PRIOR ART

DEPICTION OF PRIOR ART

DEPICTION OF PRIOR ART

DEPICTION
OF PRIOR ART

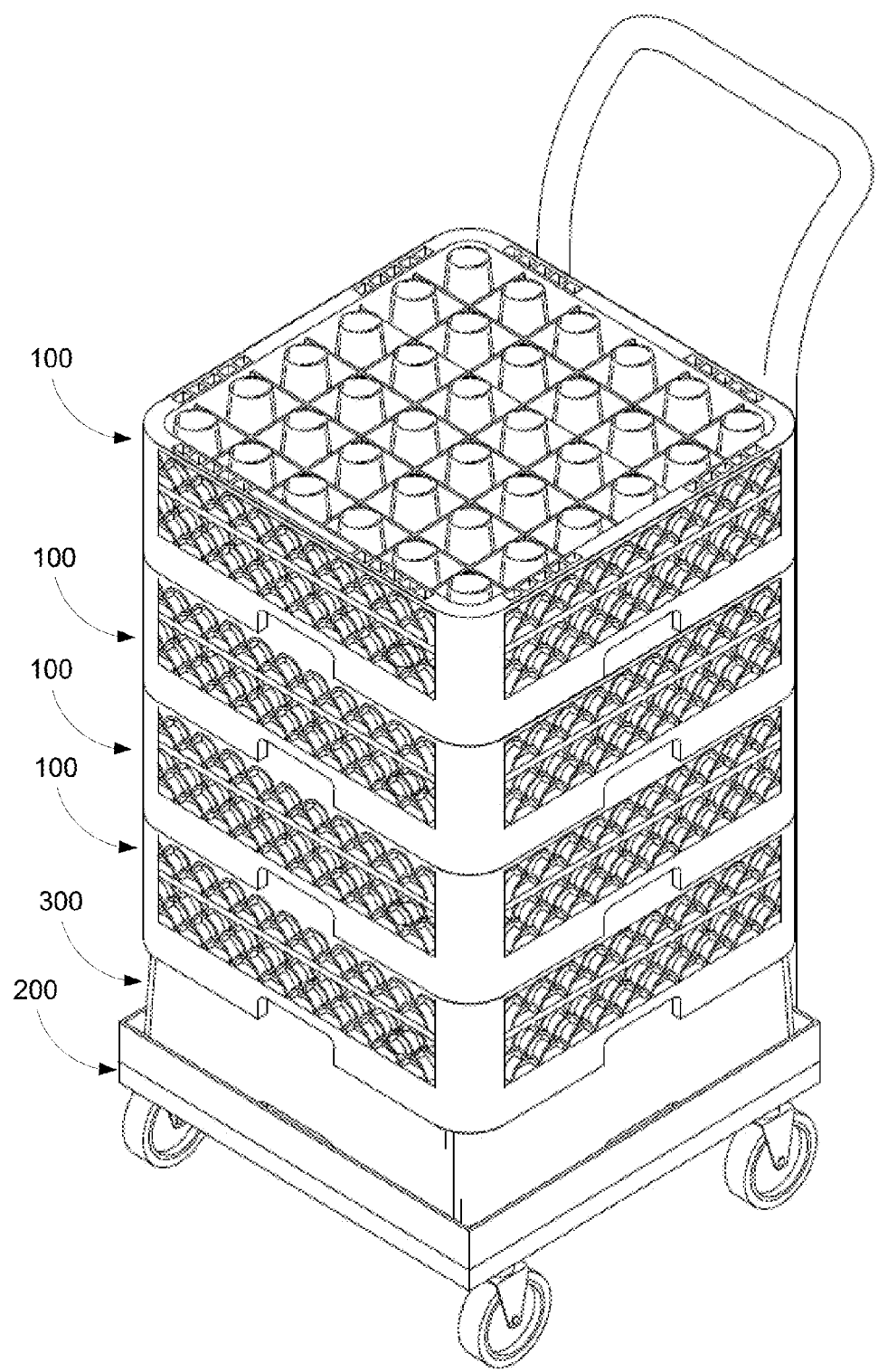

BASIN FOR USE WITH COMMERCIAL DISH AND GLASSWARE RACKS

PRIORITY CLAIM

This application claims the benefit of U.S. provisional patent application Ser. No. 61/367,380 filed Jul. 24, 2010, and U.S. non-provisional patent application Ser. No. 13/748,371 filed Jan. 23, 2013. The foregoing applications are incorporated by reference in their entirety as if fully set forth herein.

BACKGROUND

Restaurants, institutional kitchens, and other commercial or high-volume food service locations have a need to wash dish and glassware very rapidly. For decades, the most common solution has been a commercial dishwasher, typically incorporating a conveyor belt upon which large racks containing dirty dish and glassware pass through the washing compartment of the commercial dishwasher.

The dish and glassware racks have varied interior configurations, capable of carrying dishes, glasses, and tableware, among other items that are run through the commercial dishwasher for washing. The exterior configuration of the racks is generally the same, however. A dish or glassware rack for use with a commercial dishwasher is typically 19.72"×19.72" square. Although the height may vary to accommodate small dishes to tall glasses, the lateral profile of racks used with commercial dishwashers is nearly always the same.

Further, racks for use in commercial dishwashers are nearly always stackable, such that dishes and glasses can be vertically stacked for compact storage within the racks. A groove formed in the bottom face of the square rack permits it to be placed on top of another rack, with the top rail of the bottom rack mating with the groove in the bottom face of the top rack. In many racks, the top rail includes locator posts, which are upward-facing protrusions which make the interlock between a bottom rack and a rack stacked above the bottom rack more secure.

One important functional aspect of commercial dish and glassware racks is that they have openings in the bottom of the rack and on all four side walls. This allows water to spray through the bottom or side walls of the rack during washing and reach all surfaces of the dishes or glassware contained within the rack. It is simple to understand that if water could not penetrate the bottom and side surfaces of the rack, efficient cleaning of the dish or glassware would be impossible. The corollary effect, however, is that the water can drip back through the bottom of the rack.

An additional function of the openings in the bottom and sides of the rack is to permit drip-drying of the dish and glassware following its run through the commercial dishwasher. While some conveyor-belt dishwashers have a drying section, many restaurants and other kitchens opt for a commercial dishwasher that is limited to washing and does not include drying capability. Such wash-only dishwashers are less expensive, less complex, and take up less room in the kitchen than one which includes a drying section.

An issue with the use of a wash-only commercial dishwasher, however, is that during drying, the water drips straight through the bottom of the rack and onto the floor, pooling on the floor and possibly creating a safety hazard or other undesirable effect. When multiple dish and/or glassware racks are stacked following their run through the dishwasher, the water from all the racks drips onto the floor. Glasses, particularly, are loaded into a commercial glassware rack upside-down, to facilitate drip-drying. The risk of an employee slipping on the pools of water created when the water drips through the racks onto the floor is high, especially when one considers the tile or other smooth-surface floors often used in the kitchen. Also, on occasion, an employee will carry a rack loaded with dishes or glassware. The holes in the rack will permit the water to drip through the rack onto the employee's clothing, which is undesirable.

Further, when the racks are loaded with dirty dishes or glassware and then transported to the dishwasher, food remnants, unfinished drinks, and other detritus may pass through the bottom of the racks and onto the floor. In addition to the safety hazard described above, germs become an additional concern.

In some restaurants or other kitchens, following washing, the dish or glassware is transported to a storage location. This transport is often facilitated by the use of a dolly. The dolly provides a frame with wheels attached underneath the frame, where the frame is sized to receive a standard commercial dish or glassware rack. A number of racks may be stacked on the dolly, and then the stack of racks may be rolled to where the dishes or glasses are stored. Some dollies have a handle for pushing the stack of racks once loaded onto the dolly. Dollies are also used to transport racks of dirty dishes or glassware.

Most of these dollies have a frame that is open in the center. While some dollies have a closed bottom, that is uncommon. The more likely scenario when clean or dirty dishes and glasses are transported in a dolly is that water or other substances pass right through the bottom of the racks, through the frame of the dolly and onto the floor over which the dolly is being pushed. Rather than just a single pool of water, use of a dolly with an open frame can lead to potentially hazardous spills all over the establishment, including areas of a restaurant where patrons may walk.

What is needed is an apparatus for preventing water or other substances that spill out of the bottom of a commercial dish or glassware rack from passing onto the floor below. A basin with a solid base and solid sides that is sized and configured to permit interlocking with commercial dish or glassware racks could be placed on the floor at the bottom of a stack of racks, or at the bottom of a dolly, permitting drips from the racks stacked above the basin to be caught by the basin. Further, placing a basin underneath the stack of racks would elevate the clean dish and glassware further from the floor. A beneficial increase in workplace safety and sanitation is a likely result of use of such a device.

Accordingly, this application discloses a basin for use with commercial dish and glassware racks.

FIELD OF THE INVENTION

This invention relates generally to commercial dishwashers, and more specifically, to a basin for use with commercial dish and glassware racks.

SUMMARY

This invention relates generally to commercial dishwashers, and more specifically, to a basin for use with commercial dish and glassware racks. In some embodiments, a basin for use with commercial dish and glassware racks may include a four-sided base and a plurality of sides or side walls peripheral to the base. In some embodiments, the base is a square base, having four corners of approximately ninety degrees each. In some embodiments, a side is defined by an inner panel and an outer panel, the inner and outer panels being associated with a top rail of the basin, where pairs of adjoining sides form a corner. In some embodiments a corner is a rounded corner. In some embodiments, a basin for use with a commercial dish and glassware rack has area dimensions defined as the area disposed between the plurality of outer panels of approximately 19.72" by 19.72".

In some embodiments, a basin for use with commercial dish and glassware racks has a base having a top surface of the base and a bottom surface of the base. The top surface forms a floor of the basin, with the plurality of inner panels of the basin completing the interior of the basin. In some embodiments, the interior assemblies of the basin are solid, preventing the passage of water or other substances through the interior of the basin.

In some embodiments of a basin for use with commercial dish and glassware racks, each pair of an inner panel and an outer panel are panels which are upwardly inclined towards one another. In some embodiments, each pair of an inner panel and an outer panel are panels that define a space within the panels. In such an embodiment, one or more basins or commercial dish and glassware racks can be stacked and removably interlocked, such that a top rail of a commercial dish or glassware rack or a top rail of a basin can fit inside the space defined by the inner panel and outer panel. In such an embodiment, the space defined by the inner panel and outer panel receives the top rail of a basin or the top rail of a commercial dish or glassware rack, such that the commercial dish or glassware rack is "stacked" upon the basin in a removably interlocked fashion. In such an embodiment, the upward inclination of the inner panel and outer panel towards one another limits the penetration of a rack that is stacked below the basin into the space defined by basin the inner panel and outer panel of the basin.

In some embodiments, if a commercial dish or glassware rack is stacked on the basin and said commercial dish or glassware rack contains dishes or glassware that are wet or otherwise contaminated with liquids or other substances, drips containing water or other substances are caught by the basin.

In some embodiments, a basin for use with commercial dish and glassware racks includes a plurality of circular indentations in the top surface of the base of the basin. Such circular indentations trap water or other substances which have dripped from a commercial dish or glassware rack that is stacked above the basin. The circular indentations are compartment-like indentations that prevent water or other substances from freely flowing around the basin. The circular indentations trap liquids in a more contained fashion than a basin without such indentations.

In some embodiments, a basin for use with commercial dish and glassware racks includes one or more handle sections. In some embodiments, a basin for use with commercial dish and glassware racks includes one or more locator posts projecting upwardly from the top rail. A locator post is designed to be received by a portion of a channel of the bottom surface of a basin, or to be received by a portion of a channel of the bottom surface of a commercial dish and glassware rack. In some embodiments, the locator posts are curved locator posts, where the curve follows the curve of rounded corners of the basin. In a further embodiment, a basin for use with commercial dish and glassware racks is fabricated of heat-stable co-polymer plastic.

BRIEF DESCRIPTION OF THE DRAWINGS

Embodiments of the present invention are described in detail below with reference to the following drawings:

FIG. 20 is a perspective view of a basin for use with commercial dish and glassware racks, in accordance with an embodiment of the invention.

DETAILED DESCRIPTION

This invention relates generally to commercial dishwashers, and more specifically, to a basin for use with commercial dish and glassware racks. Specific details of certain embodiments of the invention are set forth in the following description and in FIGS. 1-20 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
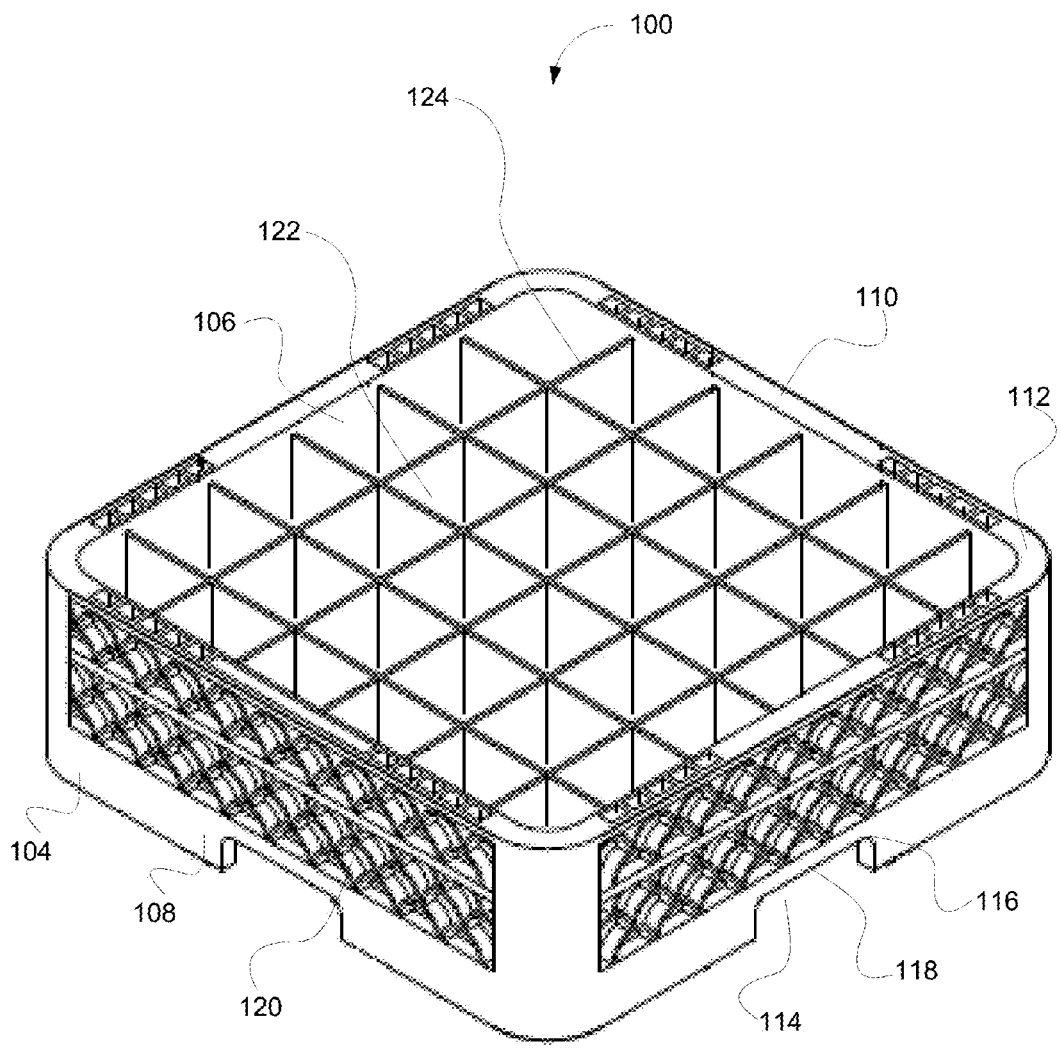
FIG. 1 is a depiction of the prior art, in this case, a perspective view of an exemplary glassware rack for use with a commercial dishwasher.

FIG. 1 is a depiction of the prior art, in this case, a perspective view of an exemplary glassware rack for use with a commercial dishwasher. Commercial dish and glassware racks and their use are well understood in the art. An exemplary glassware rack 100 may include a plurality of side walls one of which is at 104; a plurality of inner panels one of which is at 106; a plurality of outer panels one of which is at 108; a top rail at 110; a plurality of corners one of which is at 112; a plurality of handle sections one of which is at 114; a plurality of small ridges one of which is at 116; a plurality of gripping areas one of which is at 118; a plurality of side openings one of which is at 120; a network area at 122 for receiving dishware, glassware, tableware, or other items to be washed by the commercial dishwasher; and a frame at 124, for making compartments into which one or more items to be washed by the commercial dishwasher can be placed. Of note is the plurality of openings in the side of the exemplary glassware rack, designed to permit water to pass into and out of the glassware rack. The base of the rack also has a plurality of openings designed to permit water to pass into and out of the glassware rack.

Figure 2:
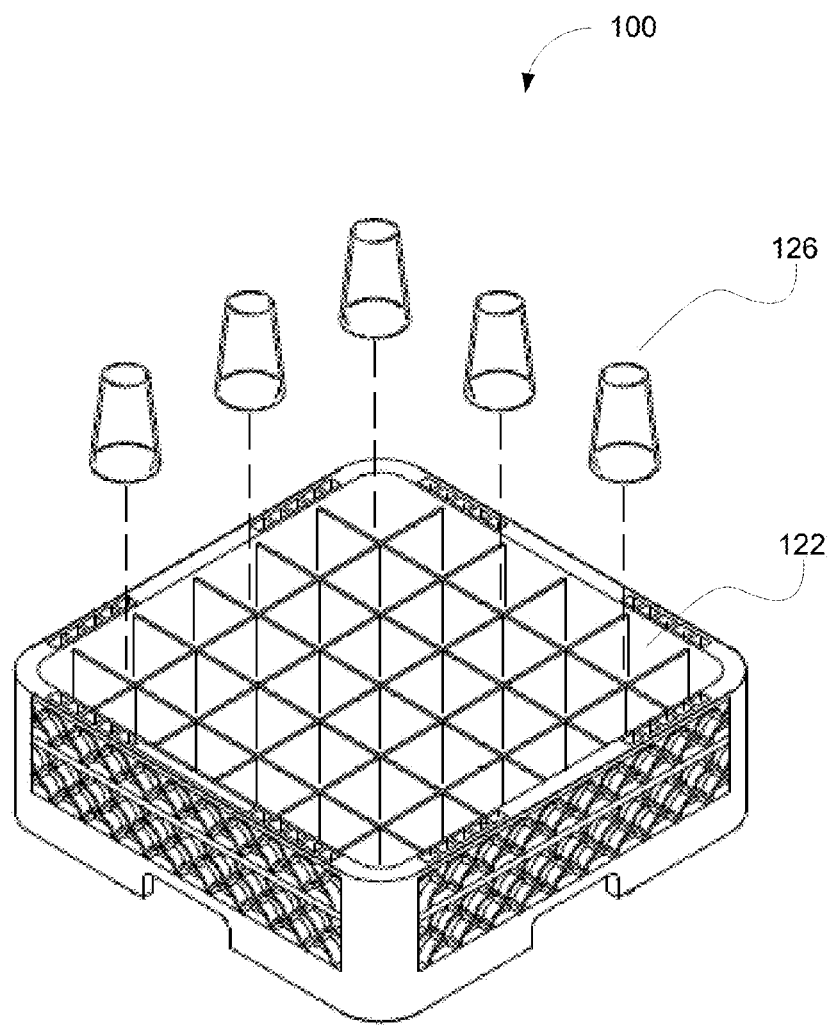
FIG. 2 is a depiction of the prior art, in this case, a perspective view of exemplary glassware being loaded into an exemplary glassware rack for use with a commercial dishwasher.

FIG. 2 is a depiction of the prior art, in this case, a perspective view of exemplary glassware being loaded into an exemplary glassware rack for use with a commercial dishwasher. An exemplary glassware rack 100 can have glasses 126 placed into the network area 122 through the top of the glassware rack 100. Of note is that the glassware is loaded upside-down, so that water penetrating the rack from the washing mechanism of the commercial dishwasher below the rack can enter the glassware for cleaning. Also, the upside-down orientation permits water or other substances to drip out of the upside-down glassware.

Figure 3:
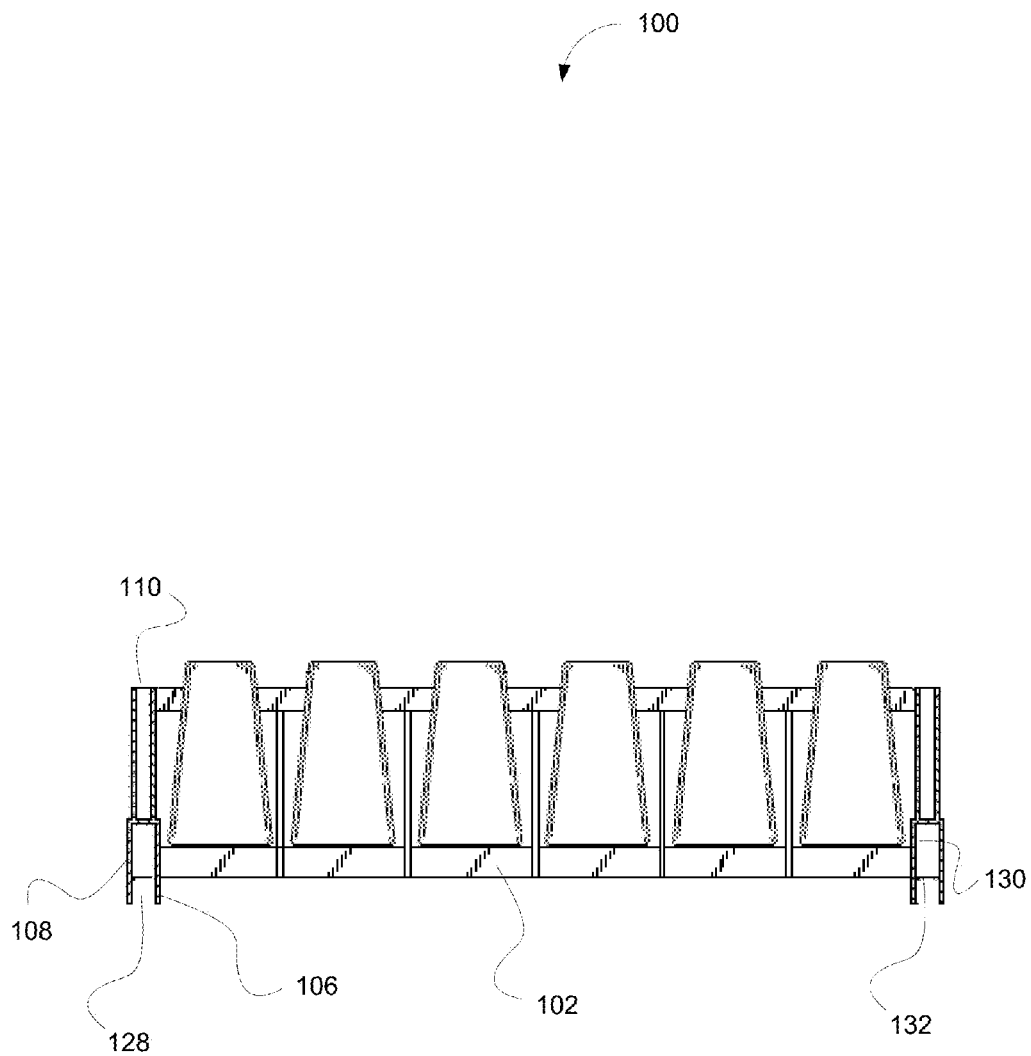
FIG. 3 is a depiction of the prior art, in this case, a cutaway lateral view of exemplary glassware that has been loaded into an exemplary glassware rack for use with a commercial dishwasher.

FIG. 3 is a depiction of the prior art, in this case, a cutaway lateral view of exemplary glassware that has been loaded into an exemplary glassware rack for use with a commercial dishwasher. An exemplary glassware rack 100 may include a base at 102, a plurality of inner panels one of which is at 106; a plurality of outer panels one of which is at 108; a channel at 128; a plurality of limiting spacers one of which is at 130, the limiting spacers each having a bottom edge of the limiting spacer, one of which is at 132. Of note is that an exemplary glassware rack 100 may have a channel 128 in the bottom surface of the base that is formed by the interior surface of the inner panel 106 (interior here meaning interior to the channel), the interior surface of the outer panel 108 (interior here meaning interior to the channel), and the plurality of bottom edges of the limiting spacers 132. The channel 128 is disposed adjacent to the outer panel 108 of each of the four sides peripheral to the base 102, where the channel 128 is adapted for receiving at least a portion of a top rail 110 of another commercial dish and glassware rack 100. The inner panel 106 and outer panel 108 of each of the four sides define a space with a plurality of limiting spacers 130 positioned therein. The plurality of limiting spacers 130 are positioned to limit the penetration of at least a portion of a top rail 110 of another commercial dish and glassware rack 100 during stacking.

Figure 4:
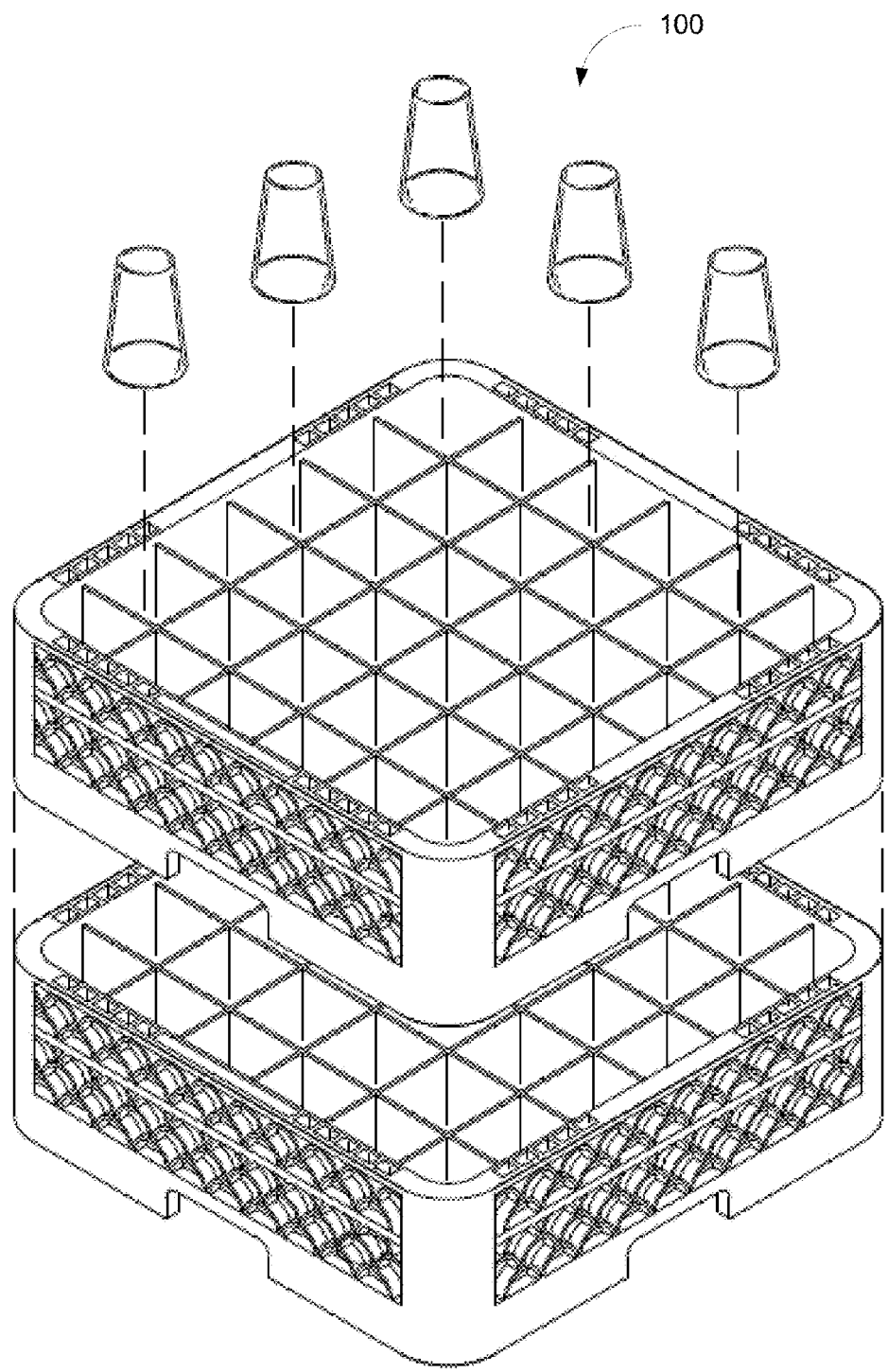
FIG. 4 is a depiction of the prior art, in this case, an exploded perspective view of exemplary glassware being loaded an exemplary glassware rack for use with a commercial dishwasher that is interlockably stackable with a different exemplary glassware rack for use with a commercial dishwasher.

FIG. 4 is a depiction of the prior art, in this case, an exploded perspective view of exemplary glassware being loaded an exemplary glassware rack for use with a commercial dishwasher that is interlockably stackable with a different exemplary glassware rack for use with a commercial dishwasher.

Figure 5:
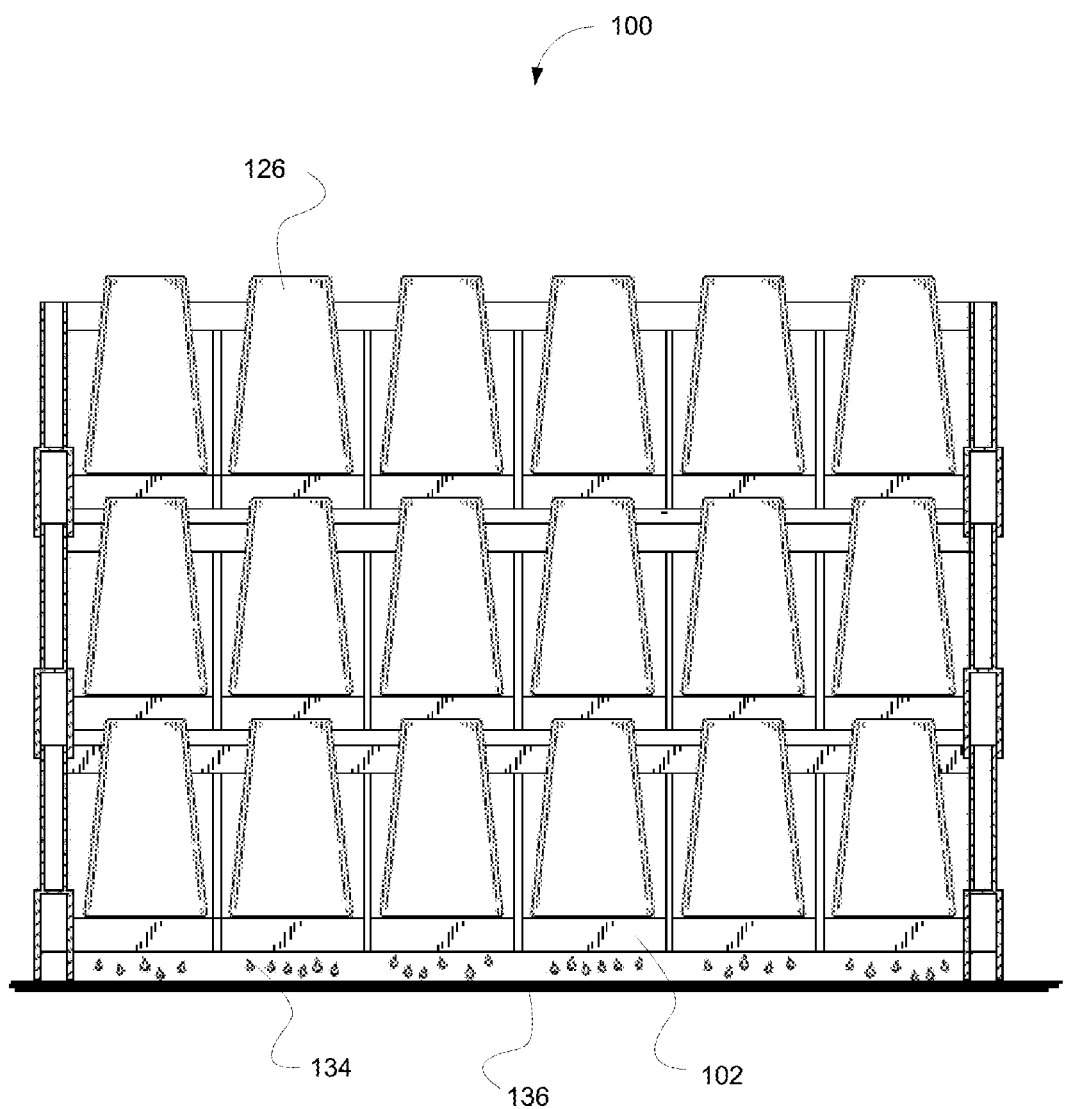
FIG. 5 is a depiction of the prior art, in this case, a cutaway lateral view of an exemplary stack of exemplary glassware racks for use with a commercial dishwasher, said racks having been loaded with exemplary glassware, said glassware dripping water or other substances through the bottom of the racks, the water or other substances being dripped directly onto the floor.

FIG. 5 is a depiction of the prior art, in this case, a cutaway lateral view of an exemplary stack of exemplary glassware racks for use with a commercial dishwasher, said racks having been loaded with exemplary glassware, said glassware dripping water or other substances through the bottom of the racks, the water or other substances being dripped directly onto the floor. The base 102 of an exemplary glassware rack 100 has a plurality of openings, similar to the plurality of openings 120 in the plurality of sides 104 in the rack 100. Of note in FIG. 5, it is clear that water 134 or other substances including unconsumed beverages can drip from the inside of the glasses 126 through the holes in the base 102 onto the floor 136 or other surface on which the rack 100 or stacked racks rest. The resulting puddle creates a safety hazard for employees or others working near the stack of racks 100.

Figure 6:
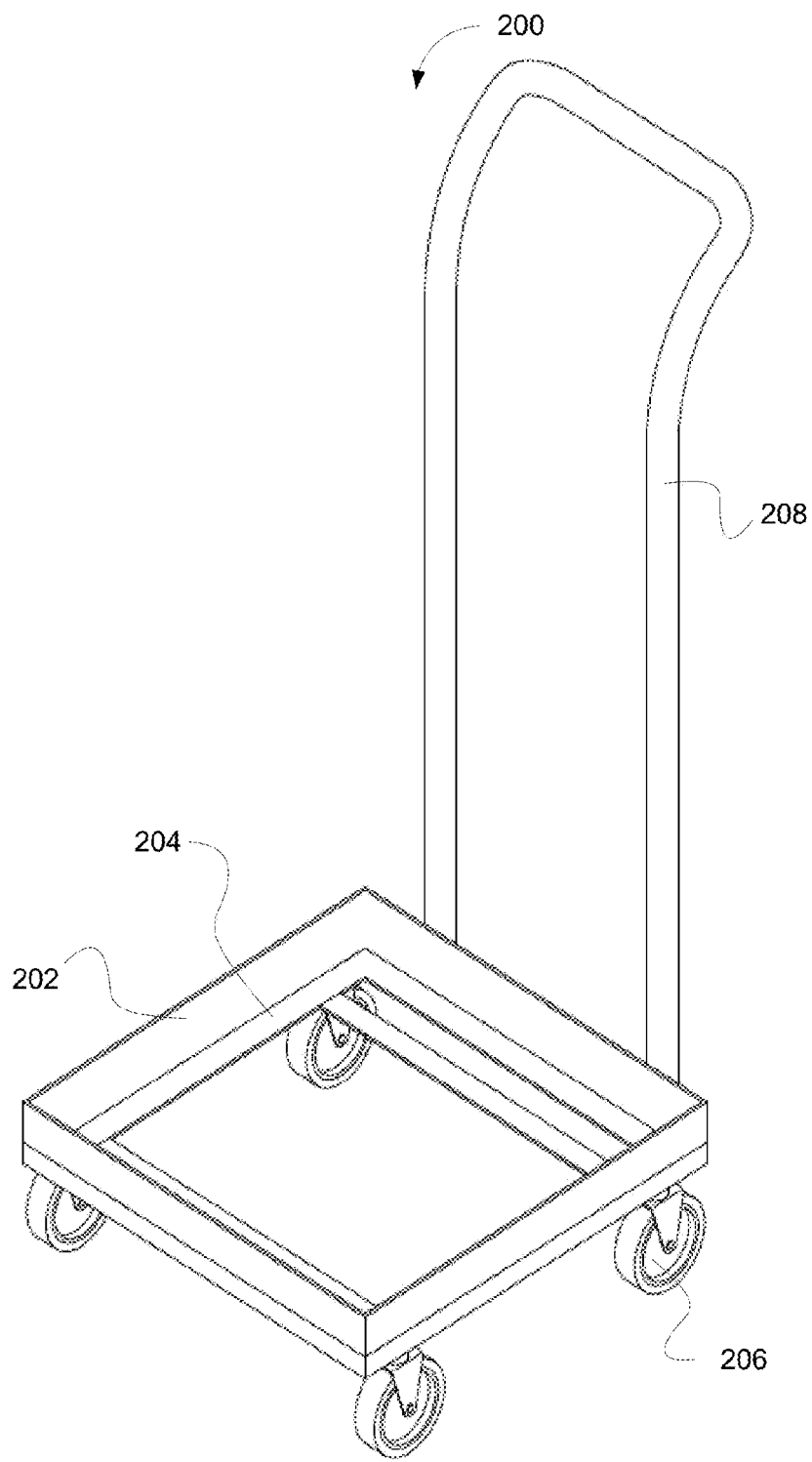
FIG. 6 is a depiction of the prior art, in this case, a perspective view of an exemplary dolly for use in transporting an exemplary stack of exemplary commercial dish or glassware racks for use with a commercial dishwasher.

FIG. 6 is a depiction of the prior art, in this case, a perspective view of an exemplary dolly for use in transporting an exemplary stack of exemplary commercial dish or glassware racks for use with a commercial dishwasher. Dollies for transporting a stack or commercial dish or glassware racks and their use are well understood in the art. An exemplary dolly 200 may include a frame at 202; a lip at 204, a plurality of wheels, one of which is at 206, and a handle at 208. The frame 202 and lip 204 are configured and dimensioned to removably receive a commercial dish or glassware rack. The inside dimensions of the frame 202 are just large enough to accommodate a 19.72" by 19.72" rack, while the lip 204 provides the surface on which the rack rests. Of note in FIG. 6 is that the exemplary dolly 200 has an open frame. It will be recognized by one with skill in the art that a dolly such as the exemplary dolly 200, when loaded with racks full of wet dish and glassware, will permit drips from the wet dish and glassware to pass directly through the rack onto the surface below on which the dolly is being rolled.

Figure 7:
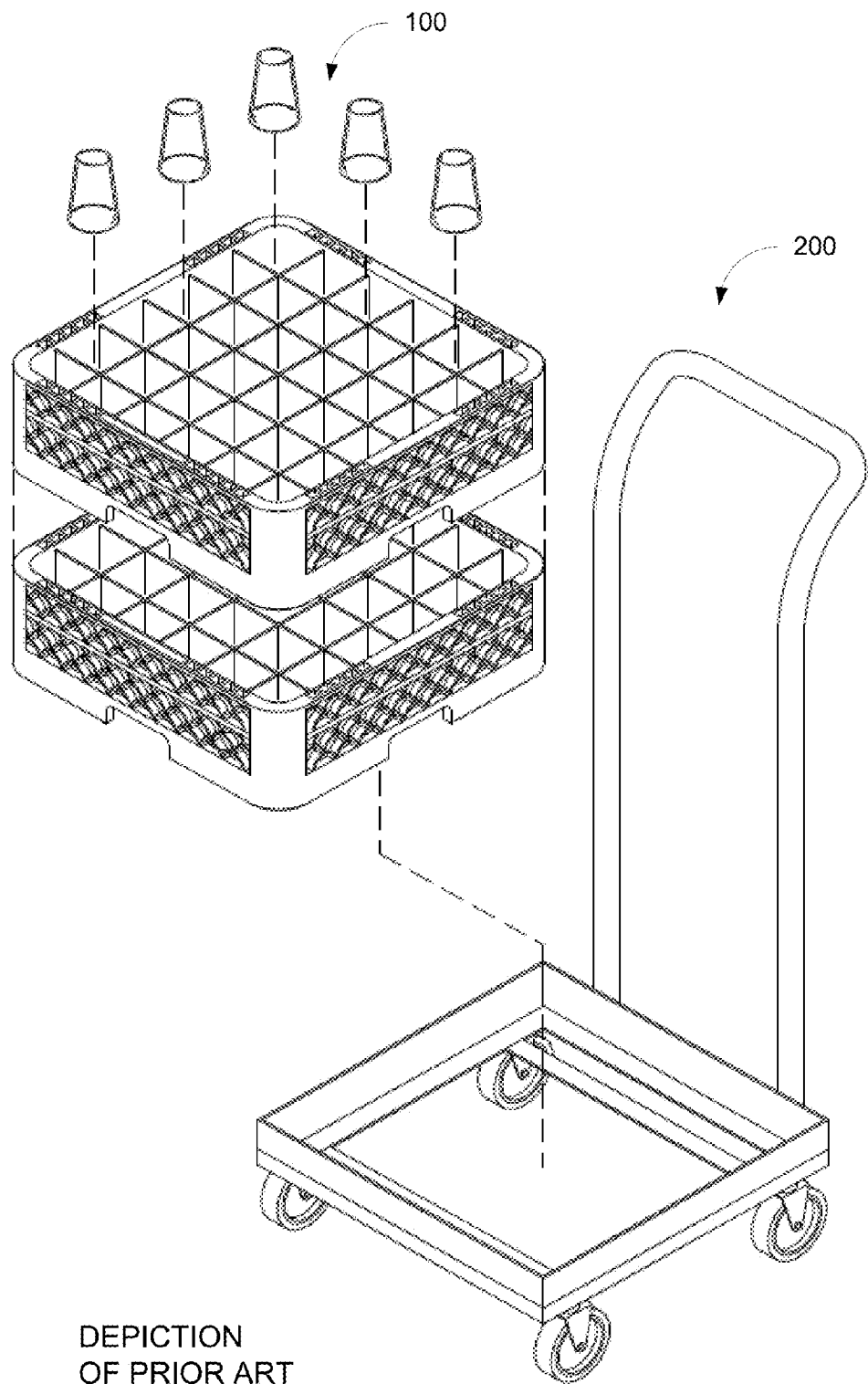
FIG. 7 is a depiction of the prior art, in this case, a perspective view of exemplary glassware being loaded an exemplary glassware rack for use with a commercial dishwasher that is interlockably stackable with a different exemplary glassware rack for use with a commercial dishwasher in an exemplary stack, the exemplary stack being loaded on an exemplary dolly.

FIG. 7 is a depiction of the prior art, in this case, a perspective view of exemplary glassware being loaded an exemplary glassware rack for use with a commercial dishwasher that is interlockably stackable with a different exemplary glassware rack for use with a commercial dishwasher in an exemplary stack, the exemplary stack being loaded on an exemplary dolly.

Figure 8:
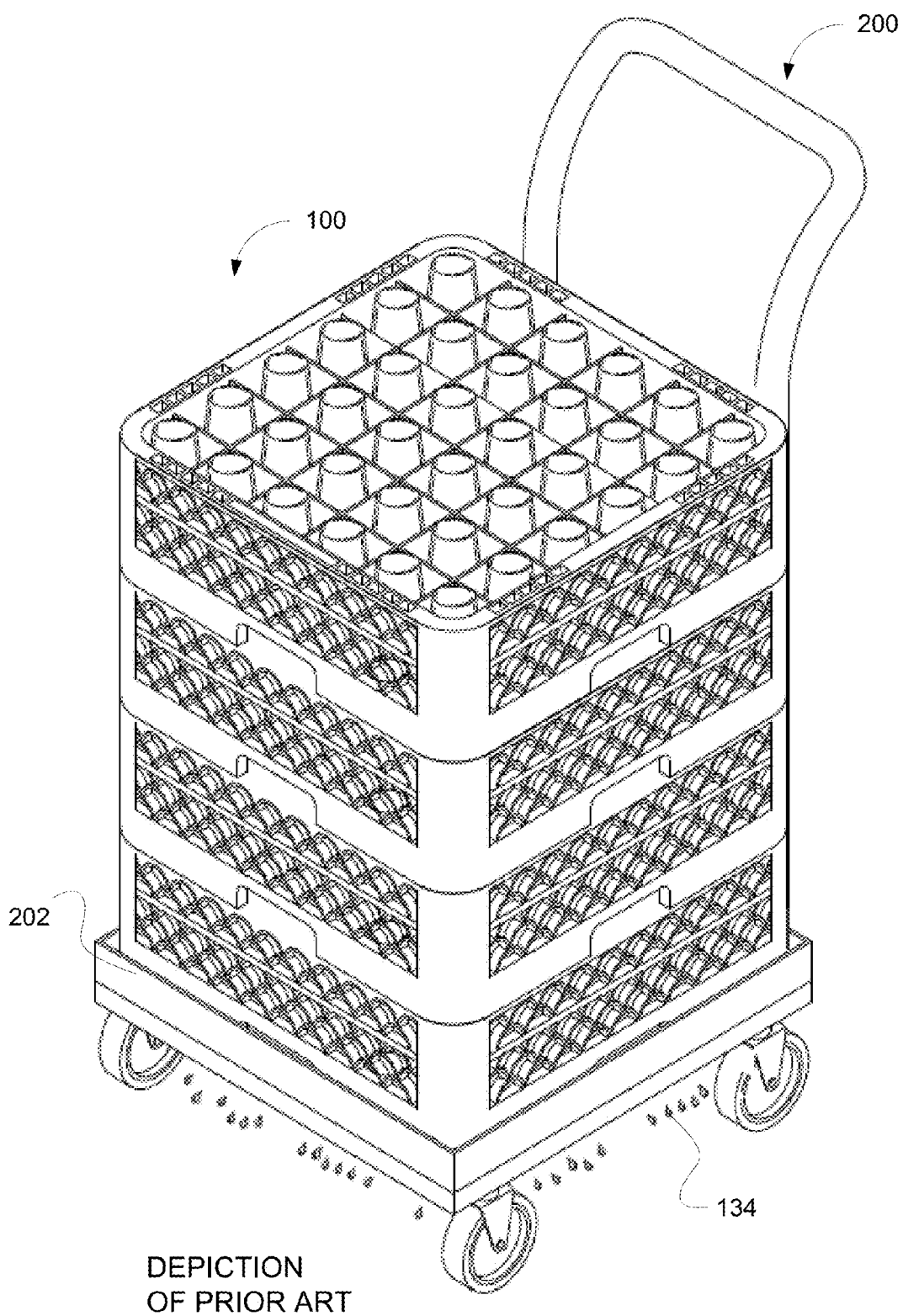
FIG. 8 is a depiction of the prior art, in this case, a perspective view of an exemplary stack of a plurality of exemplary glassware racks for use with a commercial dishwasher, the exemplary stack of racks having been placed on an exemplary dolly, the racks having been loaded with exemplary glassware, said glassware dripping water or other substances through the bottom of the racks and through the frame of the dolly, said water or other substances being dripped directly onto the floor.

FIG. 8 is a depiction of the prior art, in this case, a perspective view of an exemplary stack of a plurality of exemplary glassware racks for use with a commercial dishwasher, the exemplary stack of racks having been placed on an exemplary dolly, the racks having been loaded with exemplary glassware, said glassware dripping water or other substances through the bottom of the racks and through the frame of the dolly, said water or other substances being dripped directly onto the floor. Of note in FIG. 6 is the water 134 passing through the frame 202. The water 134 can come to rest on a floor or other surface on which the dolly 200 is being rolled over or resting, creating a spill hazard for employees or patrons who may walk in the path of the dolly 200.

Figure 9:
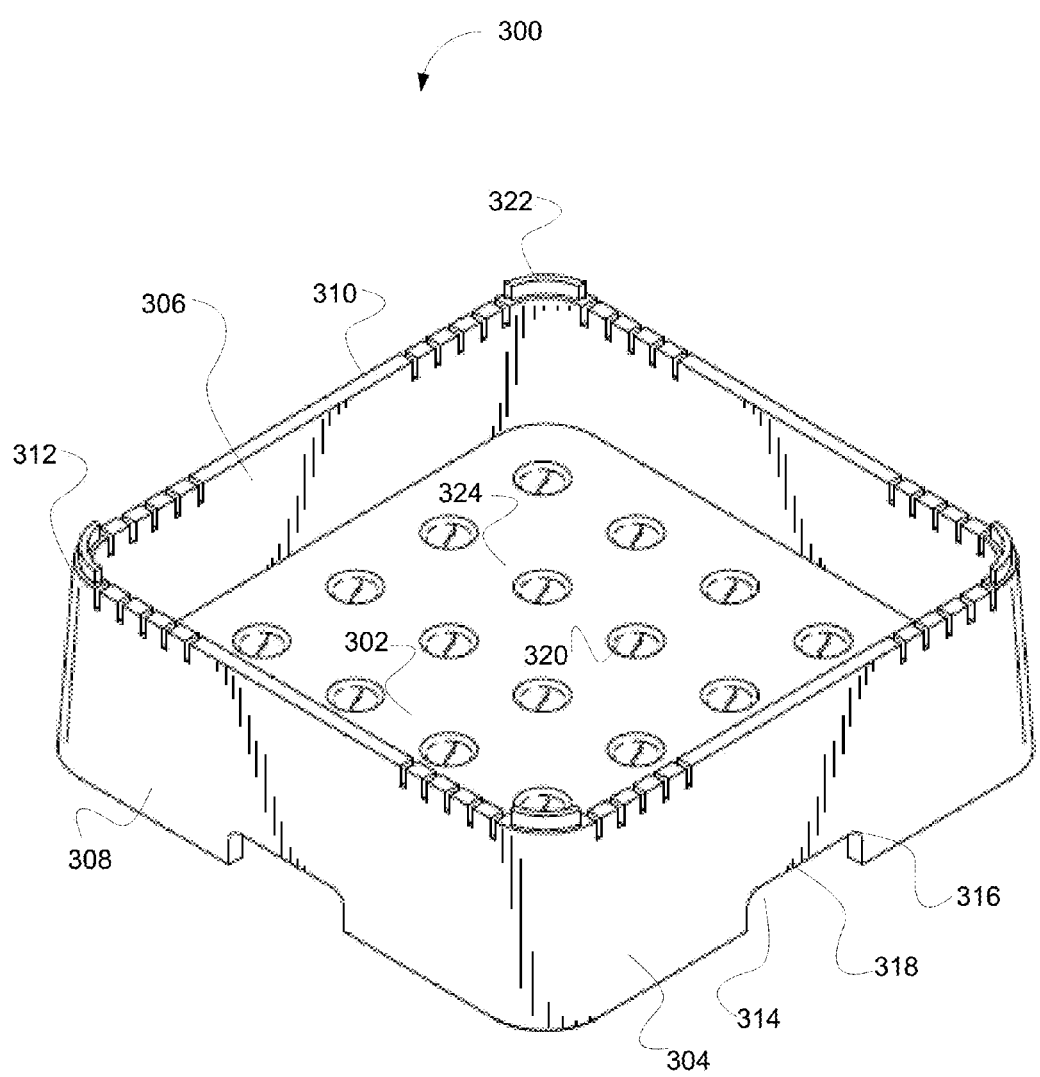
FIG. 9 is a perspective view of a basin for use with commercial dish and glassware racks, in accordance with an embodiment of the invention.
Figure 10:
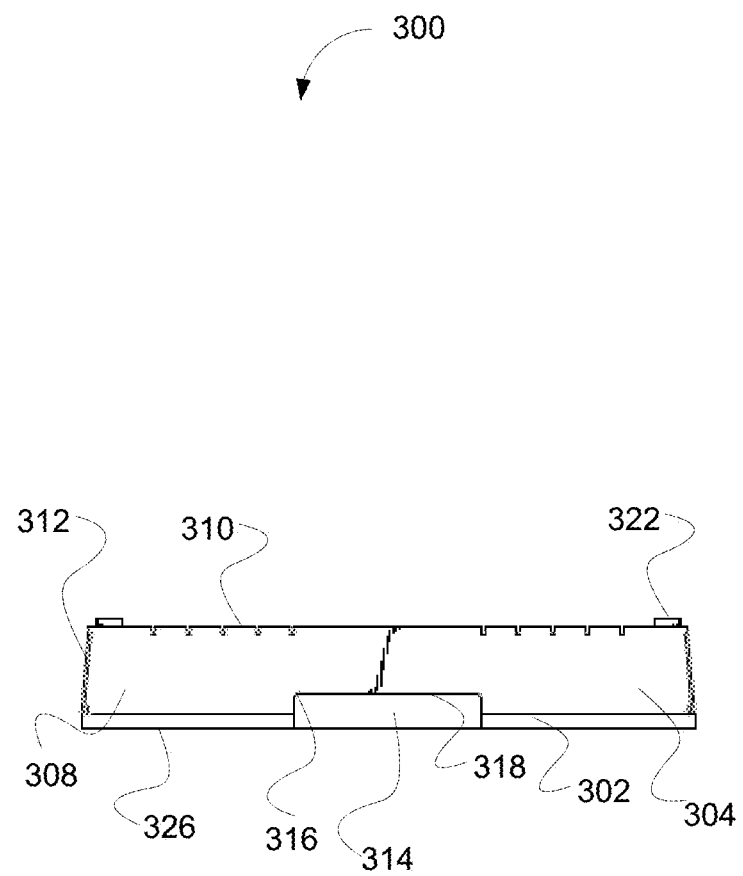
FIG. 10 is a side view of a basin for use with commercial dish and glassware racks, in accordance with an embodiment of the invention.
Figure 11:
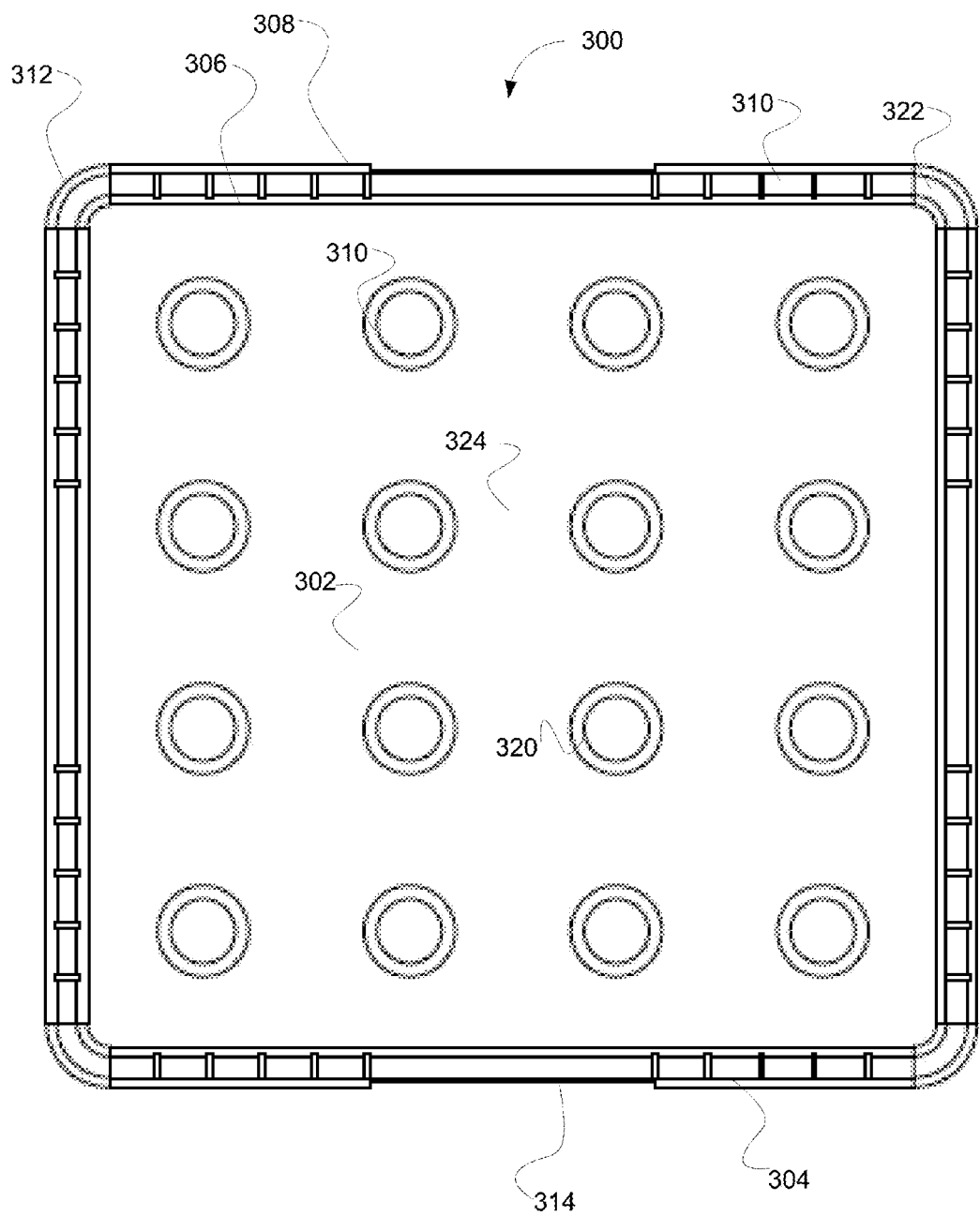
FIG. 11 is a top view of a basin for use with commercial dish and glassware racks, in accordance with an embodiment of the invention.

FIGS. 9, 10, and 11 are a perspective view, a side view, and a top view of a basin for use with commercial dish and glassware racks, in accordance with an embodiment of the invention. In some embodiments, a basin for use with commercial dish and glassware racks 300 may include a four-sided base 302 and a plurality of sides or side walls peripheral to the base, one of which is shown at 304. In some embodiments, the base is a square base, having four corners of approximately ninety degrees each. In some embodiments, a side 304 is defined by an inner panel 306 and an outer panel 308, the inner and outer panels being associated with a top rail 310 of the basin 300, where pairs of adjoining sides form a corner one of which is depicted at 312. In some embodiments a corner 312 is a rounded corner 312. In some embodiments, a basin for use with a commercial dish and glassware rack 300 has area dimensions defined as the area disposed between the plurality of outer panels 308 of approximately 19.72" by 19.72". In different embodiments, a basin for use with a commercial dish and glassware rack 300 is not a square basin. In different embodiments, a basin for use with a commercial dish and glassware rack 300 has different lengths or widths, the length or width ranging from 2 inches to 144 inches.

In some embodiments, a basin for use with commercial dish and glassware racks 300 has a base 302 having a top surface 324 of the base and a bottom surface (not depicted in FIG. 9, 10 or 11) of the base. The top surface 324 forms a floor of the basin 300, with the plurality of inner panels 306 of the basin 300 completing the interior of the basin 300. In some embodiments, the interior assemblies of the basin 300 are solid, preventing the passage of water or other substances through the interior of the basin 300.

In some embodiments of a basin for use with commercial dish and glassware racks 300, each pair of an inner panel 306 and an outer panel 308 are panels which are upwardly inclined towards one another. In some embodiments, each pair of an inner panel 306 and an outer panel 308 are panels that define a space within the panels. In such an embodiment, one or more basins 300 or commercial dish and glassware racks can be stacked and removably interlocked, such that a top rail of a commercial dish or glassware rack or a top rail 310 of a basin can fit inside the space defined by the inner panel 306 and outer panel 308. In such an embodiment, the space defined by the inner panel 306 and outer panel 308 receives the top rail 310 of a basin or the top rail of a commercial dish or glassware rack, such that the commercial dish or glassware rack is "stacked" upon the basin in a removably interlocked fashion. In such an embodiment, the upward inclination of the inner panel 306 and outer panel 308 towards one another limits the penetration of a rack that is stacked below the basin 300 into the space defined by basin the inner panel 306 and outer panel 308 of the basin 300.

In some embodiments, if a commercial dish or glassware rack is stacked on the basin 300 and said commercial dish or glassware rack contains dishes or glassware that are wet or otherwise contaminated with liquids or other substances, drips containing water or other substances are caught by the basin 300.

In some embodiments, a basin for use with commercial dish and glassware racks 300 includes a plurality of circular indentations 320 in the top surface 324 of the base 302 of the basin 300. Such circular indentations 320 trap water or other substances which have dripped from a commercial dish or glassware rack that is stacked above the basin 300. The circular indentations 320 are compartment-like indentations that prevent water or other substances from freely flowing around the basin 300. The circular indentations 320 trap liquids in a more contained fashion than a basin without such indentations.

In some embodiments, a basin for use with commercial dish and glassware racks 300 includes one or more handle sections, one of which is depicted at 314. In some embodiments, a basin 300 may have a handle section 314 only on two opposing sides 304, or may have a handle section on all four sides. A handle section 314 includes a small ridge 316 "cut out" of an outer panel 308 with which the handle section 314 is associated. A handle section includes a gripping area 318 intended to be gripped by one who carries a basin 300.

In some embodiments, a basin for use with commercial dish and glassware racks 300 includes one or more locator posts projecting upwardly from the top rail 310, one of which is located at 322. A locator post 322 is designed to be received by a portion of a channel of the bottom surface of a basin 300, or be received by a portion of a channel of the bottom surface of a commercial dish and glassware rack. It will be recognized by one skilled in the art that locator posts 322, which are generally upward protrusions from a top rail 310, may vary in size, shape, or location on the top rail. In some embodiments, locator posts 322 projecting upwardly from the top rail are L-shaped. In a further embodiment, the L-shaped locator posts project upwardly from the top rail at the four corners. In a different embodiment, the locator posts 322 are curved locator posts 322, where the curve follows the curve of rounded corners 312 of the basin 300. In some embodiments, locator posts 322 may be non-uniform or non-symmetrical in appearance. In some embodiments, locator posts 322 may have functional shapes that limit the stackability of one or more basins 300 or dish and glassware racks to a particular rotation.

In a certain embodiment, a basin for use with commercial dish and glassware racks 300 is fabricated of plastic. In a further embodiment, a basin for use with commercial dish and glassware racks 300 is fabricated of heat-stable plastic. In a further embodiment, a basin for use with commercial dish and glassware racks 300 is fabricated of heat-stable co-polymer plastic. Such plastics and their selection are well known to those skilled in the art.

It will be appreciated by those with skill in the art that the terms "basin for use with commercial dish and glassware racks," as used in the instant application including in the preamble to the claims, does not limit the function of the apparatus to being a basin, nor does it limit its use to accompany commercial dish or glassware racks. Use of the term "basin for use with commercial dish and glassware racks" in any claim preambles is not intended to give life, meaning, or vitality to the claims.

Figure 12:
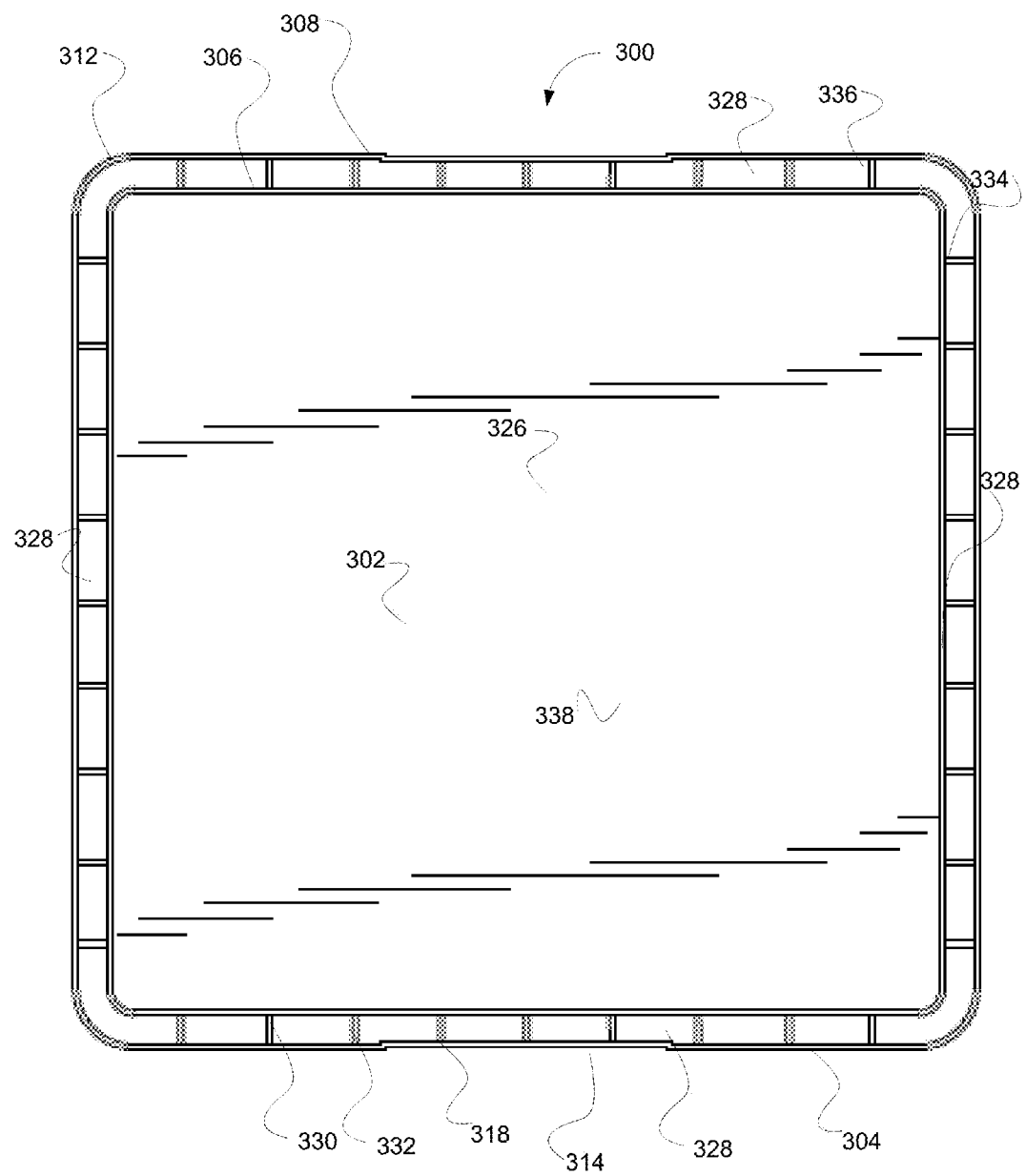
FIG. 12 is a bottom view of a basin for use with commercial dish and glassware racks, in accordance with an embodiment of the invention.
Figure 13:
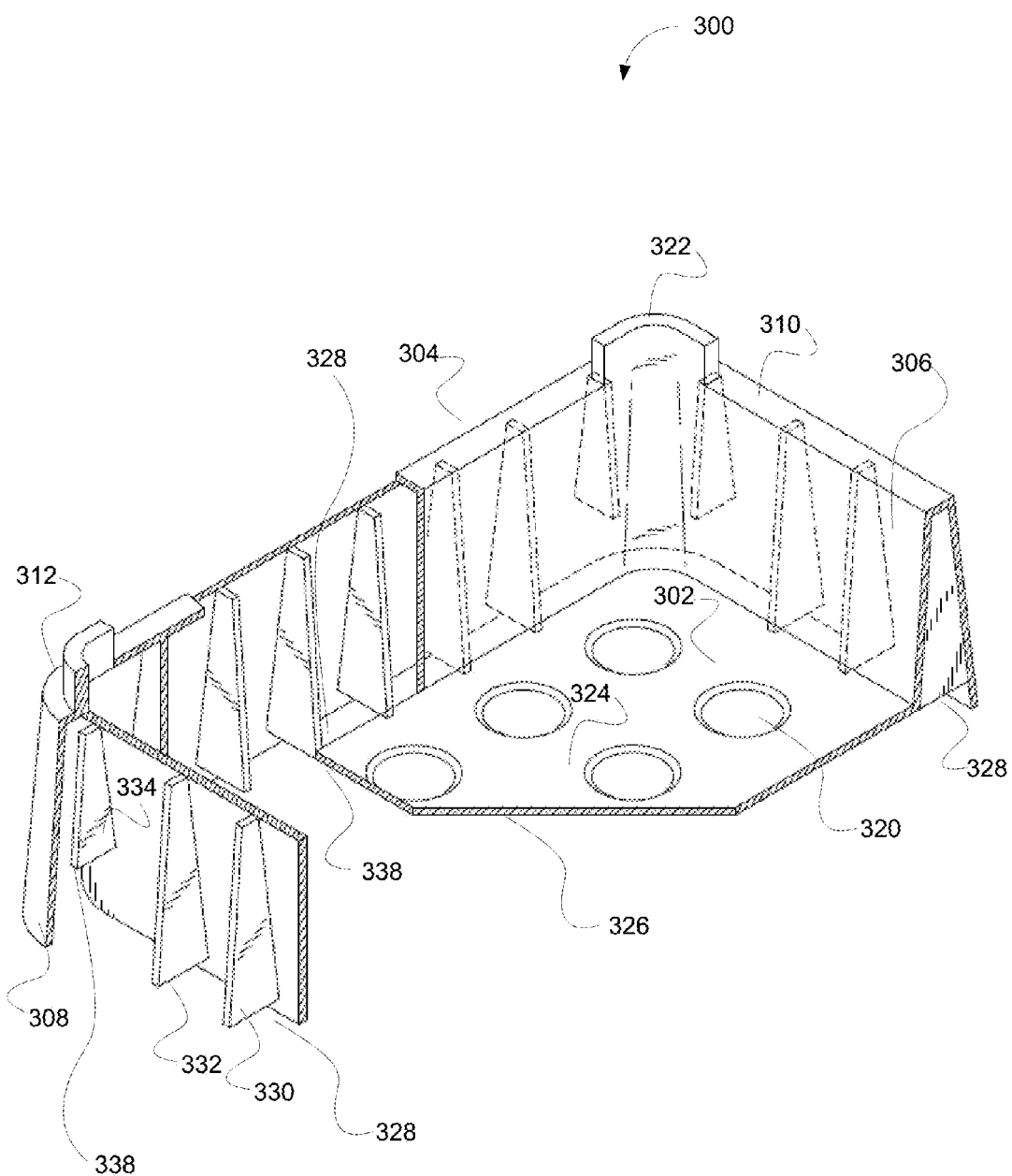
FIG. 13 is a partial perspective cutaway of a basin for use with commercial dish and glassware racks, in accordance with an embodiment of the invention.

FIG. 12 is a bottom view of a basin for use with commercial dish and glassware racks, in accordance with an embodiment of the invention. FIG. 13 is a partial perspective cutaway of a basin for use with commercial dish and glassware racks, in accordance with an embodiment of the invention.

In some embodiments, a basin for use with commercial dish and glassware racks 300 may include a base 302, the base having a bottom surface 326 of the base 302; a plurality of sides one of which is at 304, the sides 304 being defined by a plurality of inner panels one of which is at 306 and a plurality of outer panels one of which is at 308; a plurality of corners one of which is at 312; a plurality of handle sections, one of which is at 314 (not shown in FIG. 13), the handle sections 314 each having a gripping area at 318; a channel 328; a plurality of limiting spacers, one of which is at 330, the limiting spacers 330 each having a bottom edge of a limiting spacer, one of which is at 332; a plurality of short limiting spacers one of which is at 334, the short limiting spacers 334 each having a bottom edge of a short limiting spacer, one of which is at 336; and a square indentation area 338.

In some embodiments, a basin 300 includes a channel 328, which is disposed adjacent to the interior side of the outer panel 308, the channel 328 completely circumscribing the base 302 of the basin 300. In some embodiments, a channel 328 is defined by a space within the inner panel 306 and the outer panel 308. In a further embodiment, the channel 328 defined by the space within the inner panel 306 and the outer panel 308 is further defined by a plurality of limiting spacers 330 disposed between the inner panel 306 and the outer panel 308. The limiting spacers 330 do not extend to the bottom of the base 302, and the difference between the bottom of the base 302 and the bottom of the limiting spacers 330 defines the limit of penetration of at least a portion of a top rail 310 of another basin 300 or a commercial dish and glassware rack stacked underneath a basin 300. In a further embodiment, the channel 328 is further defined by a plurality of short limiting spacers 334 disposed between the inner panel 306 and the outer panel 308. In such embodiments, when a different basin 300 or a commercial dish or glassware rack is stacked with the first basin 300, the short limiting spacers 334 are configured to receive a locator post 322 of a basin 300 or a locator post of a commercial dish or glassware rack. It will be apparent to one with skill in the art that a basin 300 having locator posts 322 located in the corners 312 of the basin 300 is stacked underneath a different basin 300, the short limiting spacers 334 nearest the corners 312 of the basin 300 will engage the locator posts 322.

In some embodiments, the bottom surface 326 of a base 302 of a basin 300 has a square indentation 338. In such embodiments, when a dish or glassware rack holding dishes or glassware is stacked underneath a basin 300, with the dishes or glassware extending above the top rail of the dish or glassware rack below the basin 300, a square indentation 338 can accommodate at least a portion of the dishes or glassware such that the dishes or glassware in the rack stacked underneath the basin 300 do not touch the bottom surface 326 of the basin 300.

Figure 14:
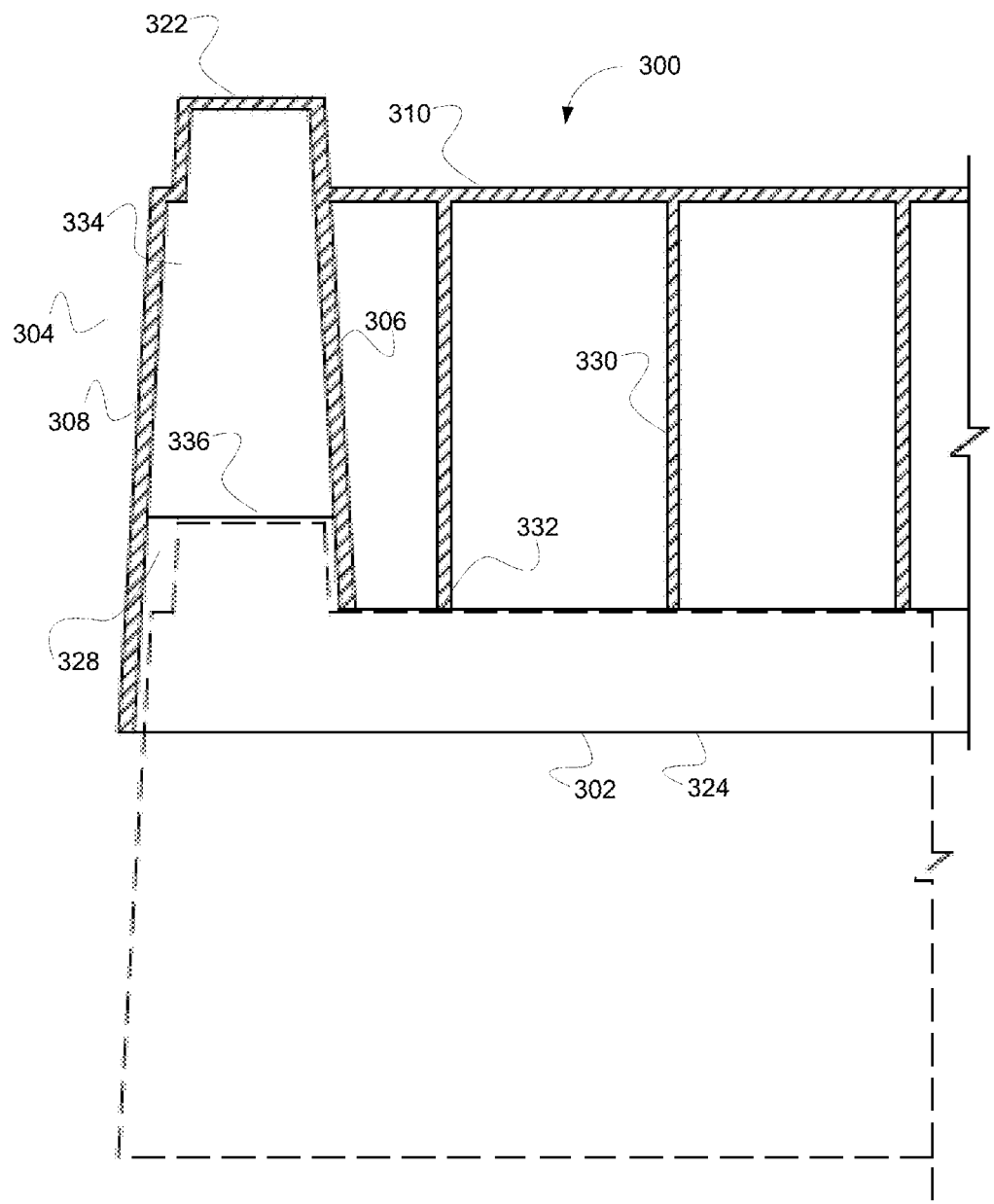
FIG. 14 is a partial lateral cutaway view of a basin for use with commercial dish and glassware racks, in accordance with an embodiment of the invention.

FIG. 14 is a partial lateral cutaway view of a basin for use with commercial dish and glassware racks, in accordance with an embodiment of the invention. In some embodiments, a basin for use with commercial dish and glassware racks 300 has a channel 328, the channel 328 being defined by a portion of the outer panel 308, the inner panel 306, the plurality of limiting spacers 330, and the plurality of short limiting spacers 334. In a certain embodiment, the channel 328 is configured to receive the top rail 310 of another basin 300, the another basin 300 being represented in dashed lines in FIG. 14. The channel 328 can also receive the top rail of a commercial dish and glassware rack. In some embodiments, the channel 328 receiving the top rail 310 facilitates the stacking of a plurality of basins 300, or a stack including a plurality of basins 300 and/or a plurality of commercial dish and glassware racks. In some embodiments, the channel 328 limits the penetration into the base of the basin 300 by the top rail of another basin 300 or the top rail of another other rack. The top rail 310 of the lower basin 300 or other rack engages the bottom edge of the limiting spacers 332, limiting the penetration. Further, for basins 300 or racks with locator posts 322 protruding upwardly from the top rail 310, the locator posts 322 of the lower basin 300 or rack will engage the bottom edge of the short limiting spacers 336 of the upper basin 300, further limiting the penetration. Further, the locator posts 322, when received by the channel 328 and engaging the bottom edge of the short limiting spacers 336 and the interior portion of the inner panel 306 of the upper basin 300, will serve to further limit the lateral travel of the plurality of racks or basins 300 with respect to one another, creating a more secure interlock when the locating posts 322 are part of the embodiment. Those skilled in the art will appreciate that many combinations of limiting spacers, short limiting spacers, top rails, and locator posts protruding upwardly from the top rail are possible, thus changing the degree of penetration of a lower basin 300 or rack into the base of an upper basin 300 or rack. Further, those skilled in the art will appreciate that such combinations can also limit stacking of basins 300 or racks to certain orientations, for example, such that when a rack is rotated 90 degrees the penetration (and thus, the height difference between the top surfaces of the bases of the racks) is varied.

Figure 15:
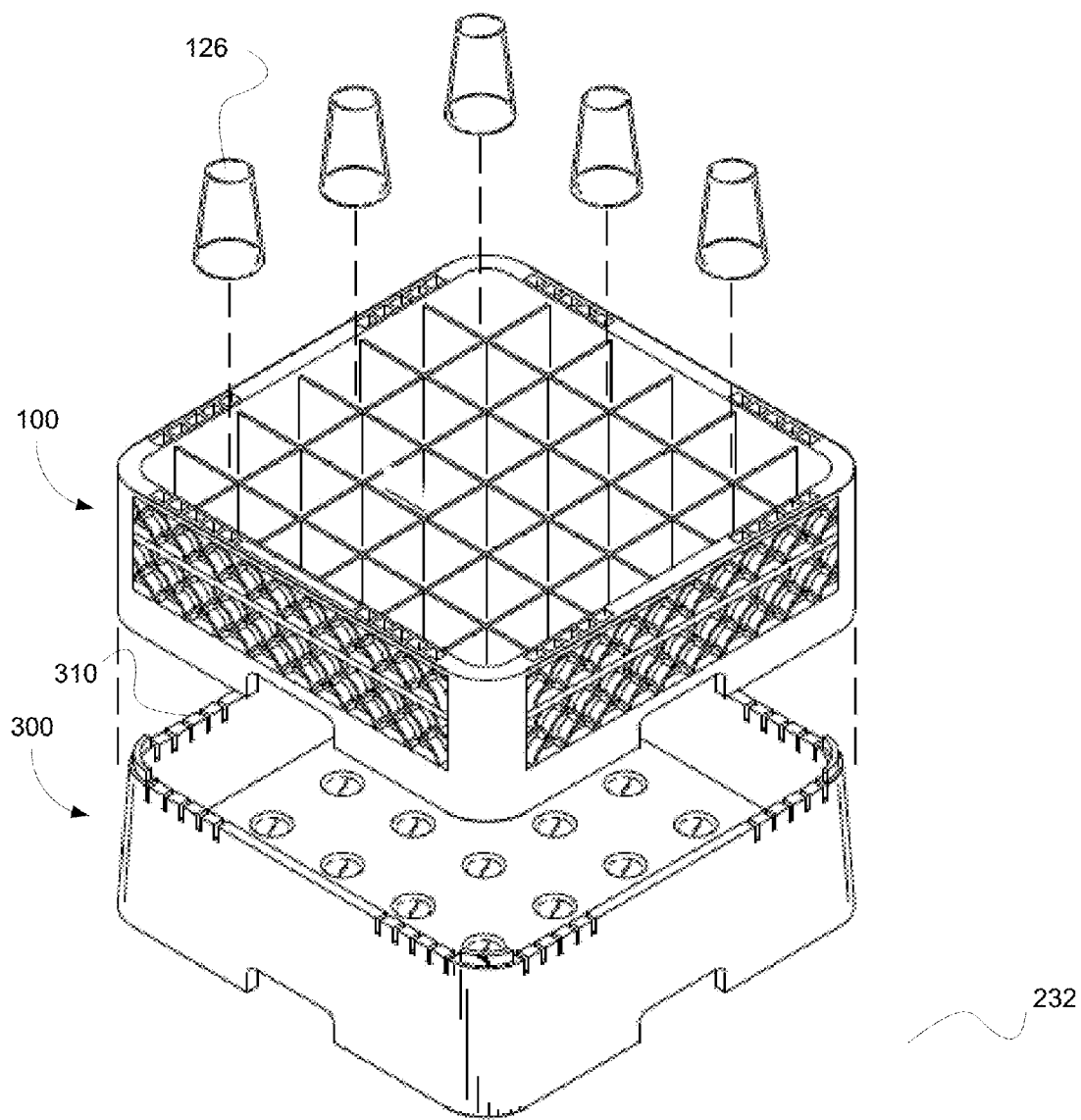
FIG. 15 is a perspective view of a basin for use with commercial dish and glassware racks, in accordance with an embodiment of the invention.
Figure 16:
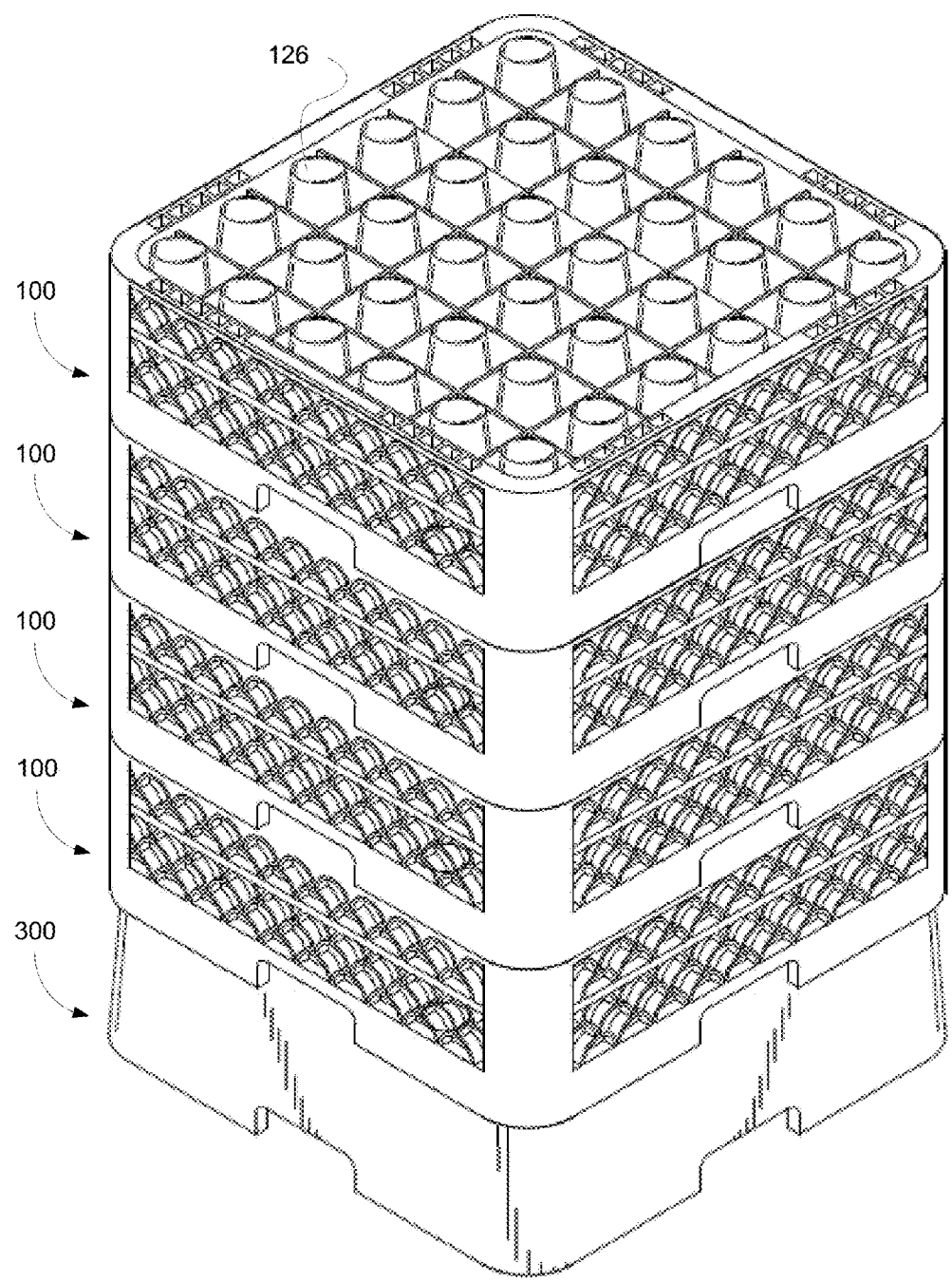
FIG. 16 is a perspective view of a basin for use with commercial dish and glassware racks, in accordance with an embodiment of the invention.

FIGS. 15 and 16 are perspective views of a basin for use with commercial dish and glassware racks, in accordance with an embodiment of the invention. In some embodiments, a commercial dish or glassware rack 100 is stacked on top of a basin for use with commercial dish and glassware racks 300. In a certain embodiment, the top rail 310 (not seen in FIG. 16) of the basin 300 is received by a channel in the commercial dish or glassware rack 100, said channel being common to all commercial dish or glassware racks as described herein. In some embodiments, a plurality of commercial dish or glassware racks 100 are stacked above a basin 300. In a further embodiment, glasses 126 are loaded upside-down into the exemplary glassware rack 100. Should the glasses 126 be wet or contain other substances due to either being washed without drying, or containing unconsumed beverages, any drips from the glasses 126 will drip into the basin 300, preventing the spillage of the water or other substances onto the surface below the glassware rack 100. Further, carrying a rack 100 with a basin 300 underneath will ensure drips will not drip onto the clothing of the person carrying the rack. Further, when use of the basin 300 has ended, the basin 300 can quickly be cleaned by rinsing it with water, or even by running it upside-down through the commercial dishwasher.

In a different embodiment, a basin 300 is stacked on top of another basin 300. Such stacking of a plurality of basins 300 could be desirable for storage of the basins, or for creating a stack of basins 300 on top of which a commercial dish or glassware rack 100 is stacked, to raise the height of the commercial dish or glassware rack 100 for easy loading or unloading. Those skilled in the art will appreciate that are many uses for a basin 300 beyond catching drips from dishes or glassware that are not dry.

Figure 17:
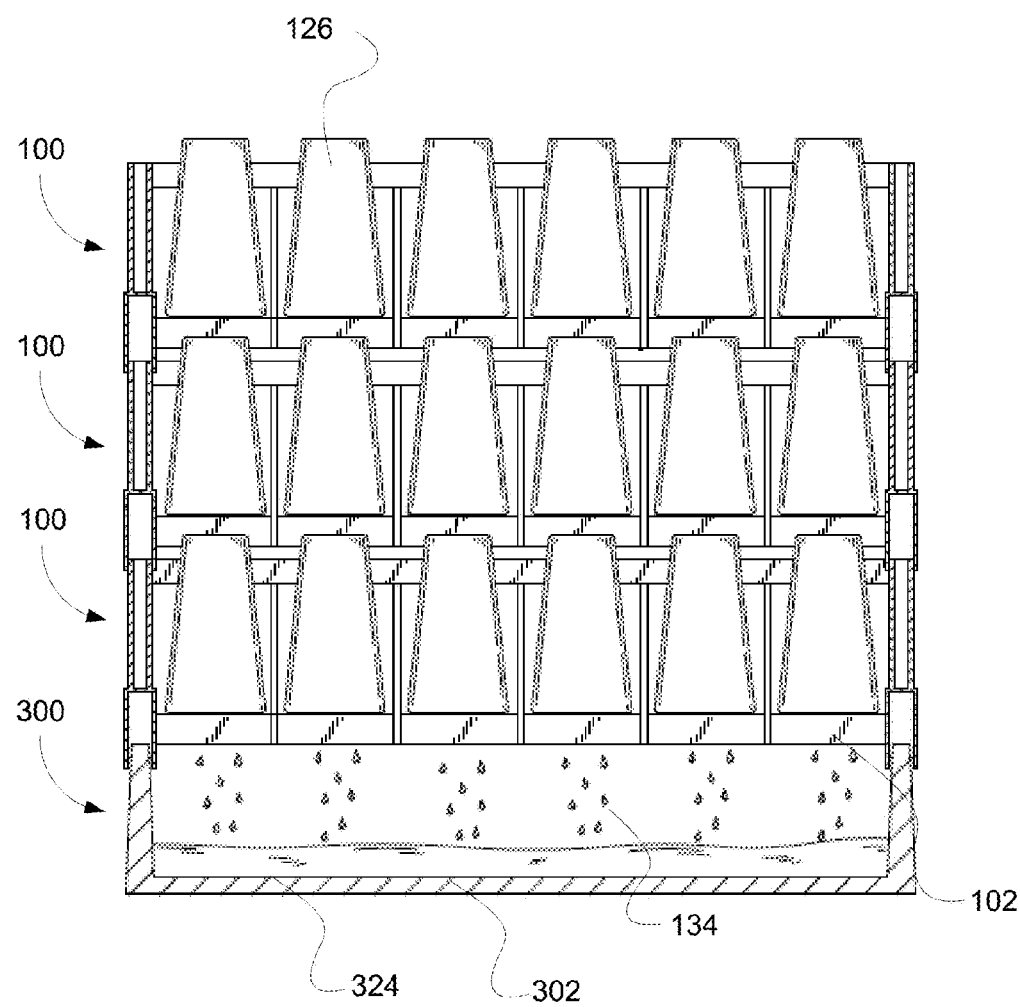
FIG. 17 is a lateral cutaway view of a basin for use with commercial dish and glassware racks, in accordance with an embodiment of the invention.
Figure 18:
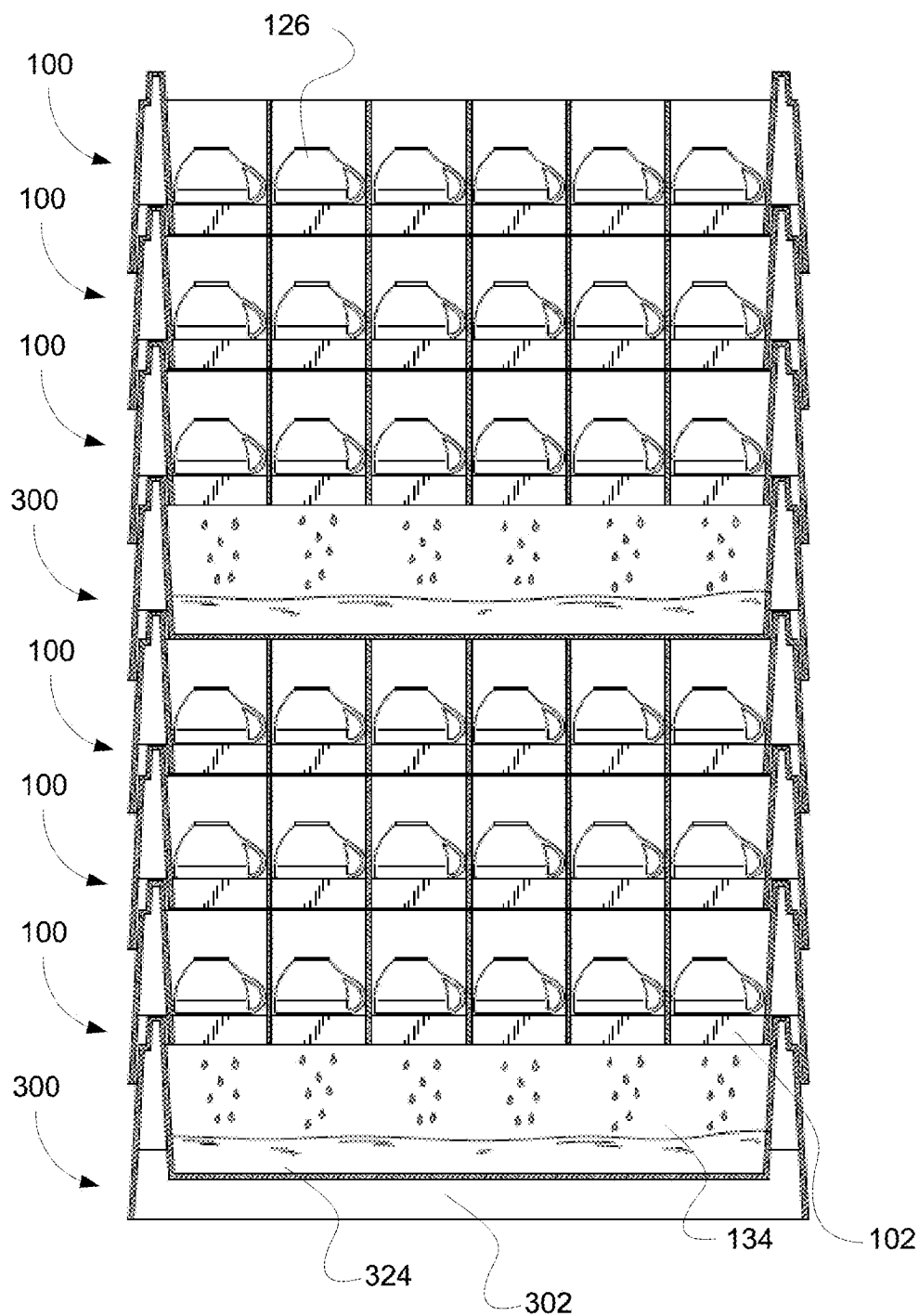
FIG. 18 is a lateral cutaway view of a basin for use with commercial dish and glassware racks, in accordance with an embodiment of the invention.

FIGS. 17 and 18 are lateral cutaway views of a basin for use with commercial dish and glassware racks, in accordance with an embodiment of the invention. In some embodiments, when a plurality of dish and glassware racks 100 are stacked on top of a basin for use with commercial dish and glassware racks 300, water drips 134 or other substances from the dishes and glassware in the racks 100 drip through the holes in the base of the rack 102 into the basin 300. The water 134 or other substances having dripped from the glasses 126 or other items in the racks 100 is contained by the basin 300, being accumulated on the top surface 324 of the base 302 of the basin. In some embodiments, a plurality of basins 300 and commercial dish and glassware racks 100 are stacked together, alternating a basin 300 with a plurality of racks 100. In this embodiment, water 134 dripping from racks 100 is spread among multiple basins 300.

Figure 19:
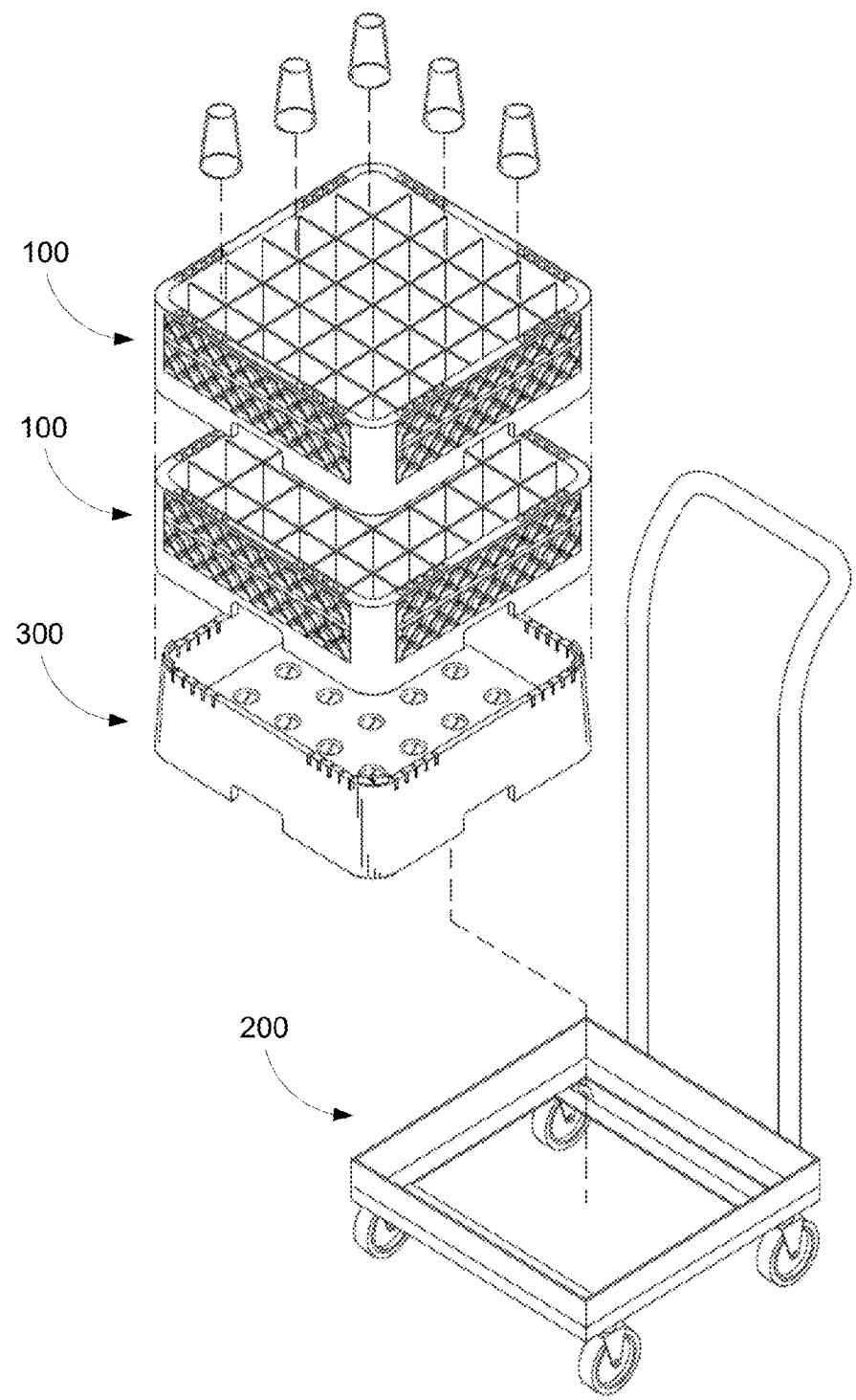
FIG. 19 is a perspective view of a basin for use with commercial dish and glassware racks, in accordance with an embodiment of the invention.

FIGS. 19 and 20 are perspective views of a basin for use with commercial dish and glassware racks, in accordance with an embodiment of the invention. In some embodiments, a basin for use with commercial dish and glassware racks 300 is received by a dolly 200. In a further embodiment, one or more commercial dish and glassware racks 100 are stacked above the basin 300. In such an embodiment, racks 100 holding dishes or glassware that is wet or to which remnants of food or drinks or other substances are adhered can be safely transported by the dolly 200 without fear that the water or other substances will drip through the racks 100 and dolly 200 onto the surface over which the dolly 200 is being pushed. Water or other substances may drip from the racks 100, but it will be contained by the basin 300 that has been placed in the dolly 200 at the bottom of the stack of racks 100.

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A basin comprising:
   a base including at least a top surface and a bottom surface;
   four sides of substantially equal height peripheral to the base, wherein pairs of adjoining sides form a rounded corner, each of the four sides including at least:
   an inner and outer panel associated with a top rail, the inner and outer panels being of substantially the same height, wherein the top rail includes locator posts projecting upwardly from the top rail, and
   wherein the outer panel of each of the four sides is upwardly inclined toward the inner panel defining a space with at least one limiting spacer positioned therein to limit the penetration of at least a portion of a top rail of another basin or a commercial dish and glassware rack; and
   wherein the basin prevents passage through the interior of the basin.

2. The basin of claim 1, wherein the base including at least a top surface and a bottom surface further includes:
   at least one indentation disposed in the top surface of the base.

3. The basin of claim 1, wherein the base including at least a top surface and a bottom surface further includes:
   at least one continuous indentation forming a channel peripheral to the inner panel of each of the four sides.

4. The basin of claim 1, wherein the base including at least a top surface and a bottom surface further includes:
   at least one raised area disposed on the top surface of the base.

5. The basin of claim 1, wherein the bottom surface of the base has at least one generally square indentation.

6. The basin of claim 1, wherein the four sides include at least one handle section.

7. The basin of claim 1, wherein the outer panels of at least two of the four sides have a handle section.

8. The basin of claim 1, wherein the limiting spacers comprise:
   at least one loop around the perimeter of the basin, the loop disposed between the inner and outer panels of the four sides.

9. The basin of claim 1, wherein the bottom surface of the base is higher than a lower edge of the plurality of limiting spacers.

10. The basin of claim 1, wherein the bottom surface of the base is lower than a lower edge of the limiting spacers.

11. The basin of claim 1, wherein the base including at least a top surface and a bottom surface further comprises:
    at least a plurality of indentations disposed in the top surface of the base.

12. The basin of claim 1, wherein the base including at least a top surface and a bottom surface further comprises:
    at least a plurality of raised areas disposed on the top surface of the base.

* * * * *